(12) United States Patent
Numata

(10) Patent No.: US 12,418,728 B2
(45) Date of Patent: Sep. 16, 2025

(54) PHOTOELECTRIC CONVERSION APPARATUS, CONTROL METHOD FOR CONTROLLING THE SAME, AND STORAGE MEDIUM

(71) Applicant: CANON KABUSHIKI KAISHA, Tokyo (JP)

(72) Inventor: Aihiko Numata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 360 days.

(21) Appl. No.: 18/153,302

(22) Filed: Jan. 11, 2023

(65) Prior Publication Data

US 2023/0247307 A1    Aug. 3, 2023

(30) Foreign Application Priority Data

Jan. 28, 2022 (JP) ................................ 2022-012037

(51) Int. Cl.
*H04N 23/81* (2023.01)
*H04N 5/265* (2006.01)
(Continued)

(52) U.S. Cl.
CPC ............. *H04N 23/81* (2023.01); *H04N 5/265* (2013.01); *H04N 23/71* (2023.01); *H04N 23/73* (2023.01); *H04N 23/76* (2023.01)

(58) Field of Classification Search
CPC ........ H04N 23/81; H04N 5/265; H04N 23/71; H04N 23/73; H04N 23/76; H04N 25/587; H04N 25/68; H04N 25/773
See application file for complete search history.

(56) References Cited

U.S. PATENT DOCUMENTS

2018/0270405 A1*   9/2018  Ota .................... H10F 77/959

FOREIGN PATENT DOCUMENTS

EP    3 547 668 A1    10/2019
JP    H07067043 A      3/1995
(Continued)

OTHER PUBLICATIONS

Kazuhiro Morimoto et al.; "A megapixel time-gated SPAD image sensor for 2D and 3D imaging applications;" Advanced Quantum Architecture Laboratory (AQUA), Ecole Polytechnique Federale de Lausanne (EPFL), 2002 Neuchatel, Switzerland; Device Research & Design Department, Canon Inc., 212-8602, Kanagawa, Japan; Dec. 30, 2019; pp. 1-11.

*Primary Examiner* — Sinh Tran
*Assistant Examiner* — Angel L Garces-Rivera
(74) *Attorney, Agent, or Firm* — Canon U.S.A., Inc. IP Division

(57) ABSTRACT

A photoelectric conversion apparatus includes a processing circuit, and a memory that stores a computer-readable instruction for causing, when executed by the processing circuit, the photoelectric conversion apparatus to generate control signals for controlling an operation of an image capturing unit configured to perform image capturing using avalanche light emission, control a first generation unit to generate control signals of a first frame and a second frame, wherein a number of the control signals during an exposure period of the second frame is smaller than a number of the control signals during an exposure period of the first frame, acquire an output of the first frame captured by the image capturing unit and an output of the second frame captured by the image capturing unit, and generate an image based on the output of the first frame and the output of the second frame.

19 Claims, 26 Drawing Sheets

(51) Int. Cl.
*H04N 23/71* (2023.01)
*H04N 23/73* (2023.01)
*H04N 23/76* (2023.01)

(56) References Cited

FOREIGN PATENT DOCUMENTS

JP 2011071958 A 4/2011
JP 2020123847 A 8/2020

\* cited by examiner

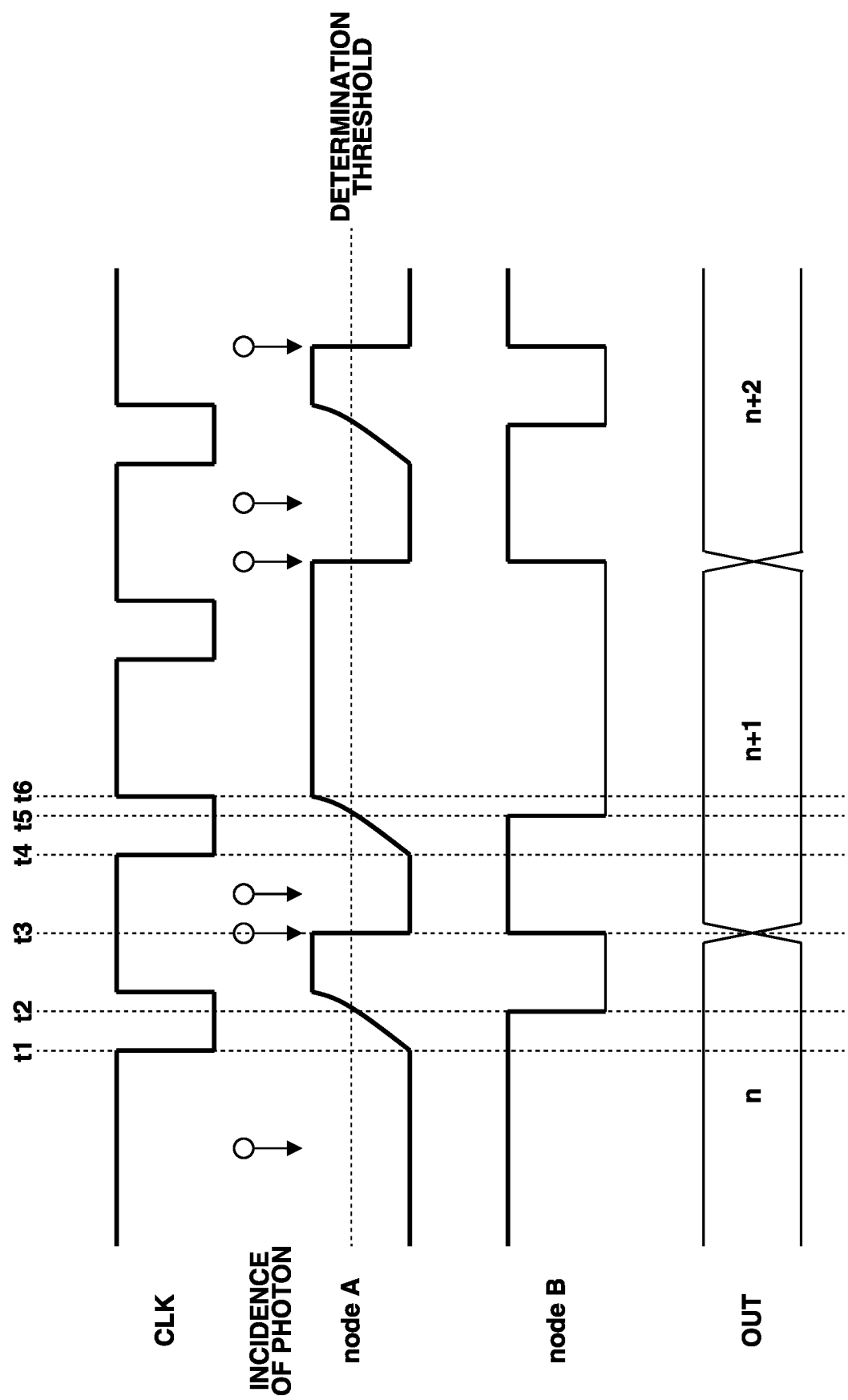

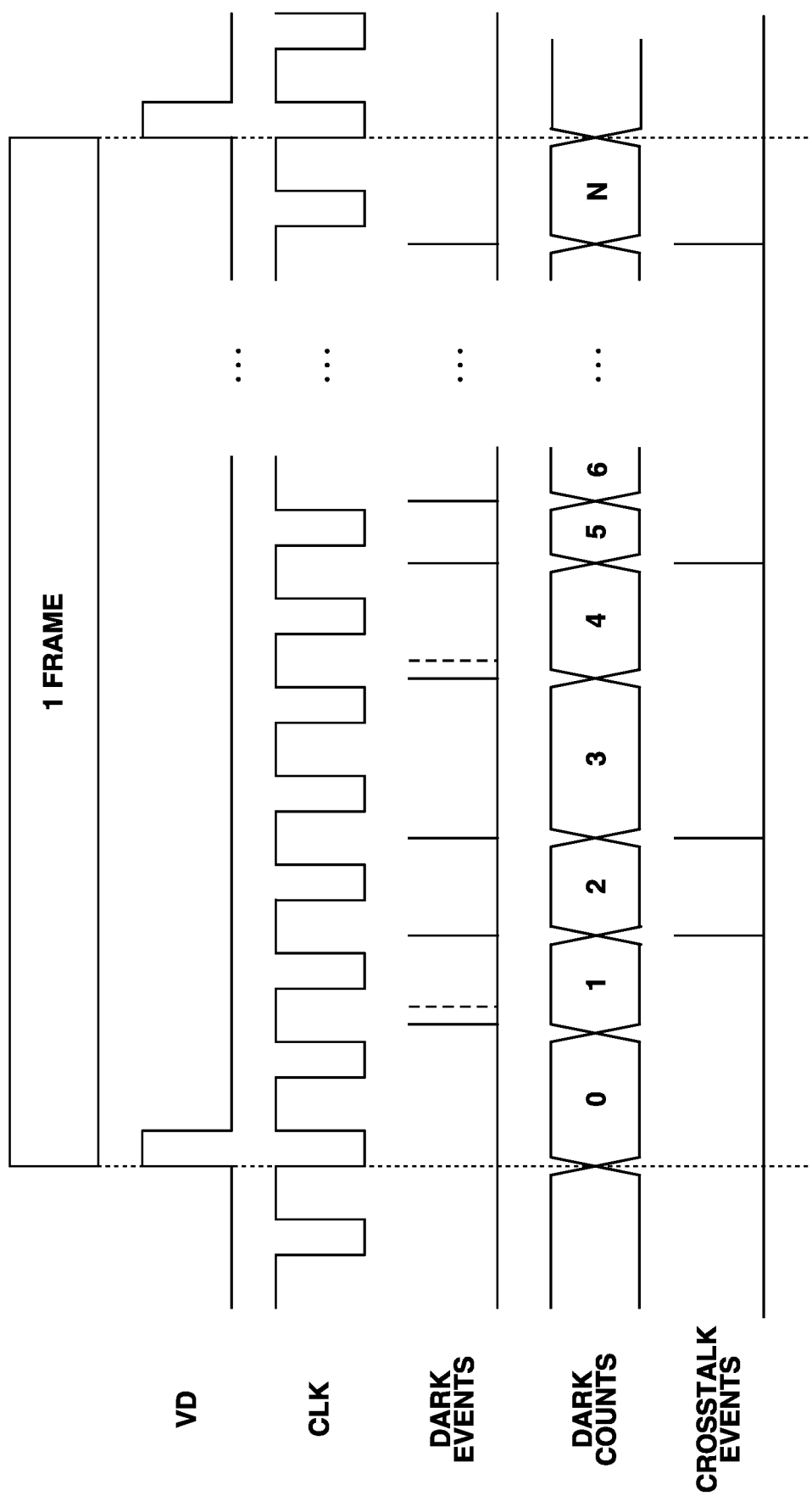

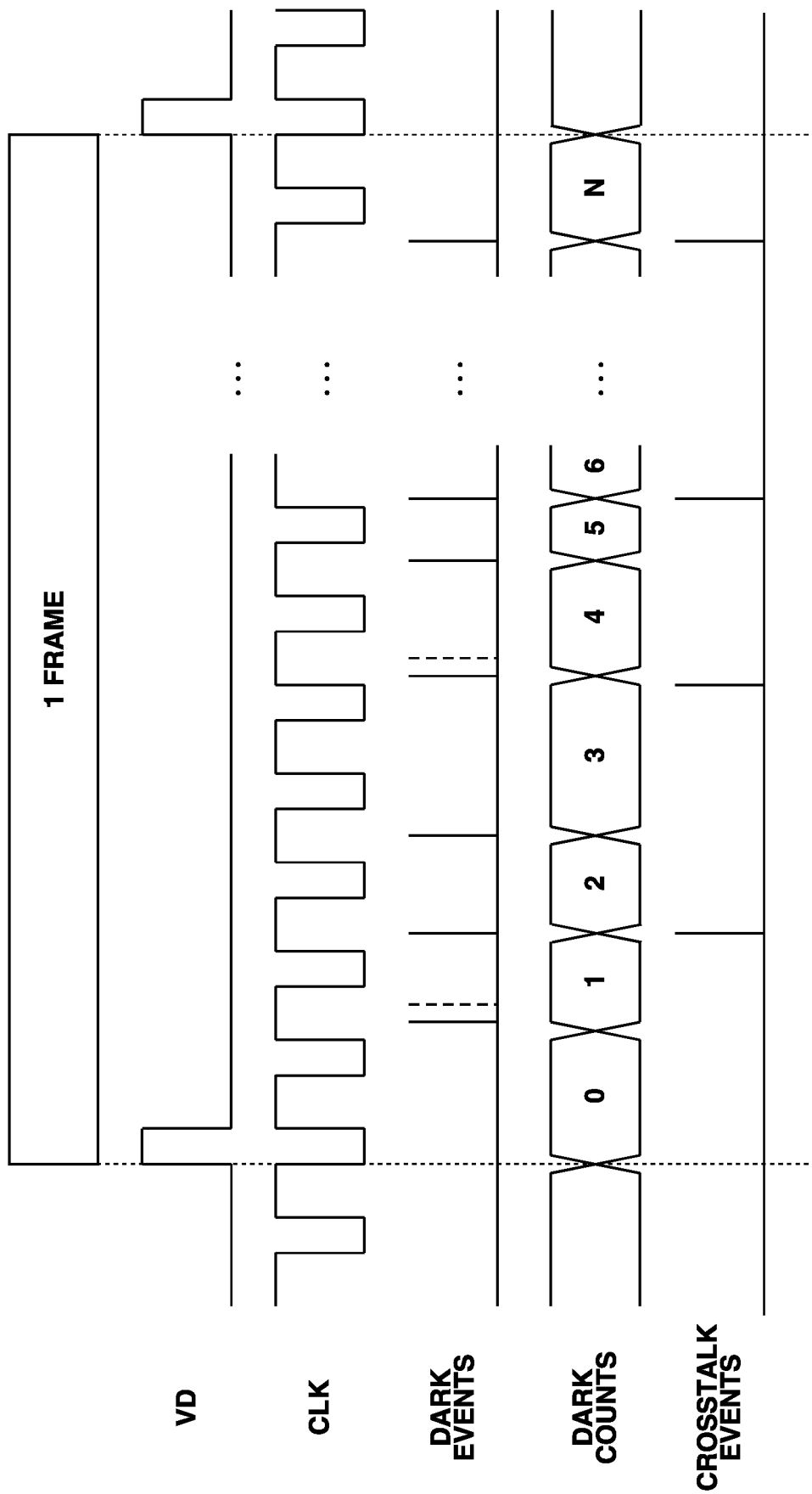

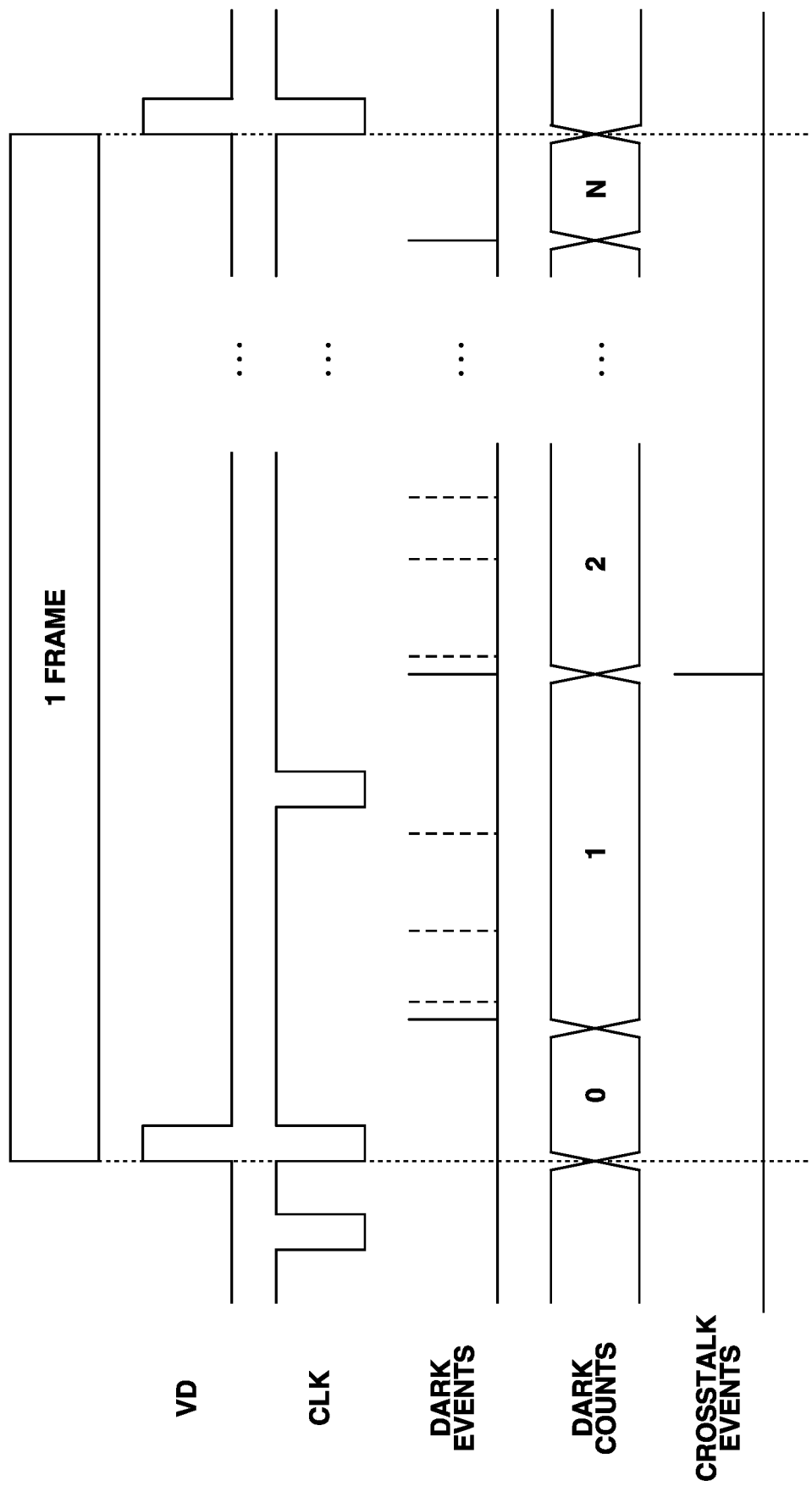

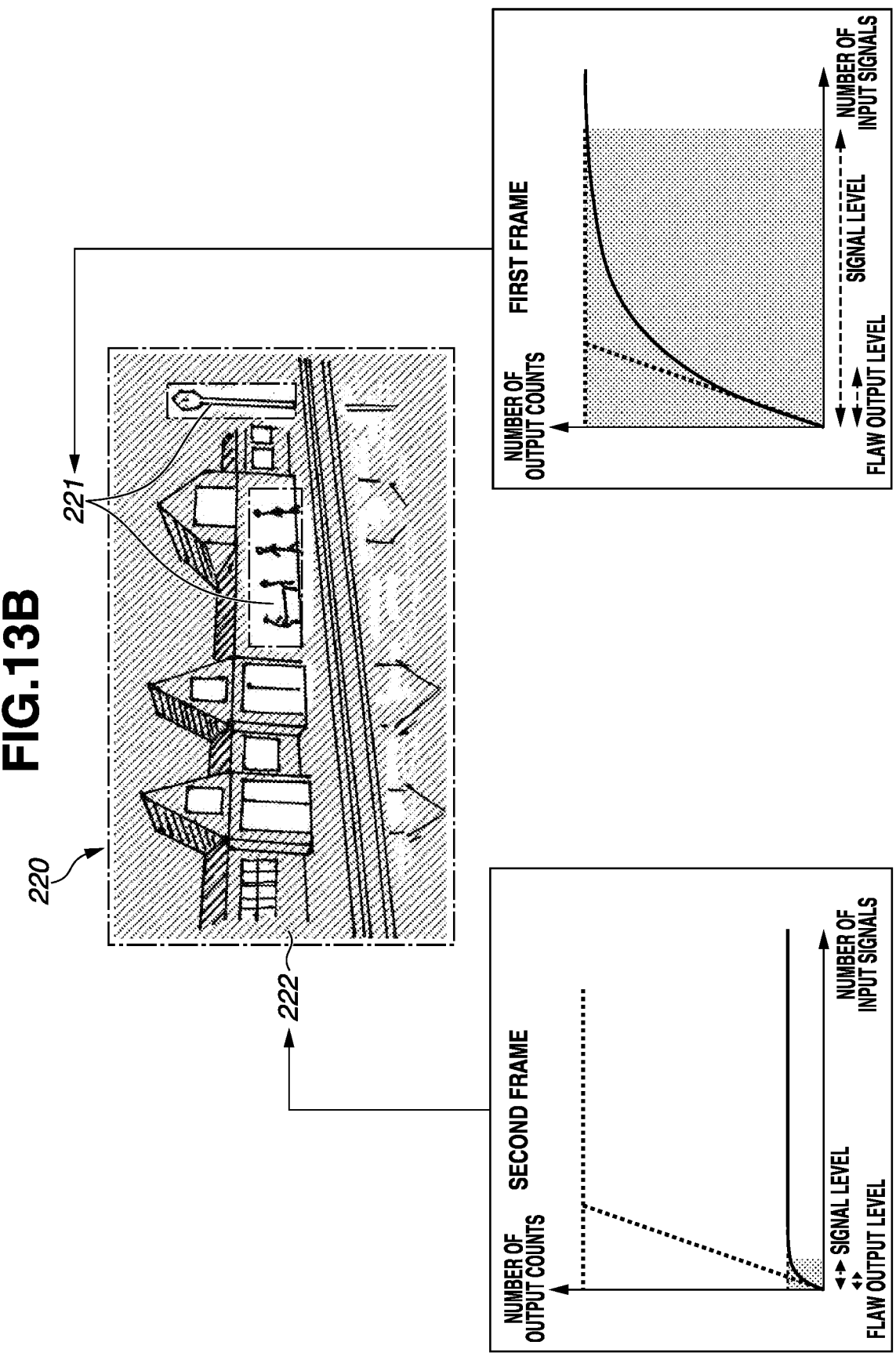

| | SECOND FRAME | FIRST FRAME | THIRD FRAME |
|---|---|---|---|
| NUMBER OF PULSE SIGNALS | MAXIMUM NUMBER OF PULSE SIGNALS Nmax / 16 | MAXIMUM NUMBER OF PULSE SIGNALS Nmax | MAXIMUM NUMBER OF PULSE SIGNALS Nmax |
| LENGTH OF EXPOSURE PERIOD | MAXIMUM EXPOSURE PERIOD Tmax | MAXIMUM EXPOSURE PERIOD Tmax | MAXIMUM EXPOSURE PERIOD Tmax / 16 |

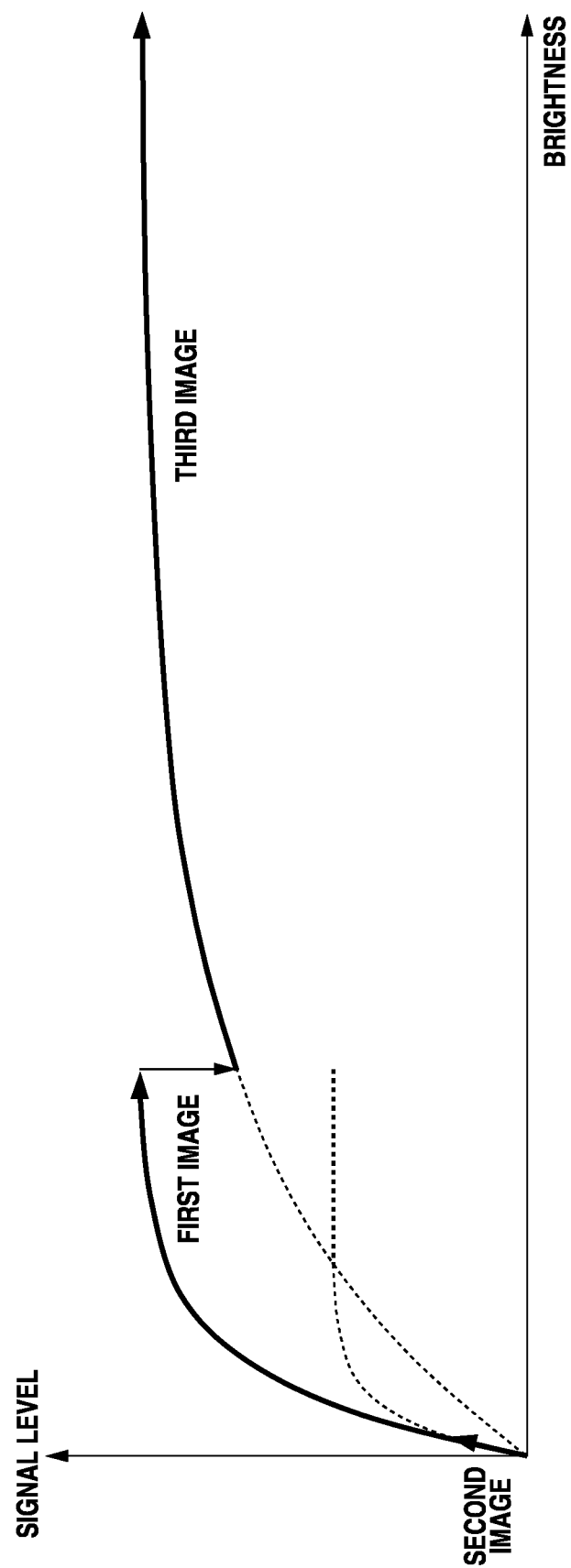

PHOTOELECTRIC CONVERSION APPARATUS, CONTROL METHOD FOR CONTROLLING THE SAME, AND STORAGE MEDIUM

BACKGROUND OF THE INVENTION

Field of the Invention

The present invention relates to an image combining technique performed by a photoelectric conversion apparatus using avalanche light emission.

Description of the Related Art

In recent years, a photoelectric conversion apparatus that digitally counts the number of photons reaching an avalanche photodiode (APD) and outputs the counted value as a photoelectrically converted digital signal from a pixel is discussed. In the following description, an avalanche photodiode will occasionally be referred to as an "APD".

In a photoelectric conversion apparatus discussed in the publication of Japanese Patent Application Laid-Open No. 2020-123847, a pixel includes an APD, a quench circuit connected to the APD, and a signal control circuit that receives an output signal from the APD, and a pulse generation circuit is connected to the quench circuit and the signal control circuit. The pulse generation circuit controls the turning on and off of the quench circuit. In the publication of Japanese Patent Application Laid-Open No. 2020-123847, the potential of the output node of the APD is reset, and a pulse signal according to an input photon is output even under a high luminance.

SUMMARY OF THE INVENTION

According to an aspect of the present invention, a photoelectric conversion apparatus includes a processing circuit, and a memory that stores a computer-readable instruction for causing, when executed by the processing circuit, the photoelectric conversion apparatus to generate control signals for controlling an operation of an image capturing unit configured to perform image capturing using avalanche light emission, control a first generation unit to generate control signals of a first frame and a second frame, wherein a number of the control signals during an exposure period of the second frame is smaller than a number of the control signals during an exposure period of the first frame, acquire an image of the first frame captured by the image capturing unit and an image of the second frame captured by the image capturing unit, and generate an image based on the image of the first frame and the image of the second frame.

Further features of the present invention will become apparent from the following description of embodiments with reference to the attached drawings.

BRIEF DESCRIPTION OF THE DRAWINGS

FIG. 5 is a timing chart of the photoelectric conversion apparatus.

FIG. 7A is a timing chart according to a comparative example when high-illuminance image capturing is performed.

FIG. 7B is a timing chart according to the comparative example when low-illuminance image capturing is performed.

FIG. 10B is a timing chart of the photoelectric conversion apparatus according to the first embodiment.

FIG. 13B is a diagram illustrating the combining process performed by the photoelectric conversion apparatus according to the first embodiment.

FIG. 17B is a diagram illustrating the combining process performed by the photoelectric conversion apparatus according to the third embodiment.

DESCRIPTION OF THE EMBODIMENTS

Embodiments for carrying out the present invention will be described in detail below. The following embodiments do not limit the present invention, and not all the combinations of the features described in the embodiments are essential for a method for solving the issues in the present invention. The configurations of the embodiments can be appropriately modified or changed depending on the specifications of a system and an apparatus to which the present invention is applied, and various conditions (the use conditions and the use environment). The technical scope of the present invention is determined by the appended claims, and is not determined by the following individual embodiments. In all the drawings, components having the same functions are designated by the same signs, and are not repeatedly described.

First to third embodiments of the present invention are described below. FIGS. 1A to 5 illustrate configurations common to the first to third embodiments. FIGS. 6A to 14B illustrate processing regarding the first embodiment. FIGS. 15A to 16B illustrate processing regarding the second embodiment. FIGS. 17A and 17B illustrate processing regarding the third embodiment.

Figure 1A:
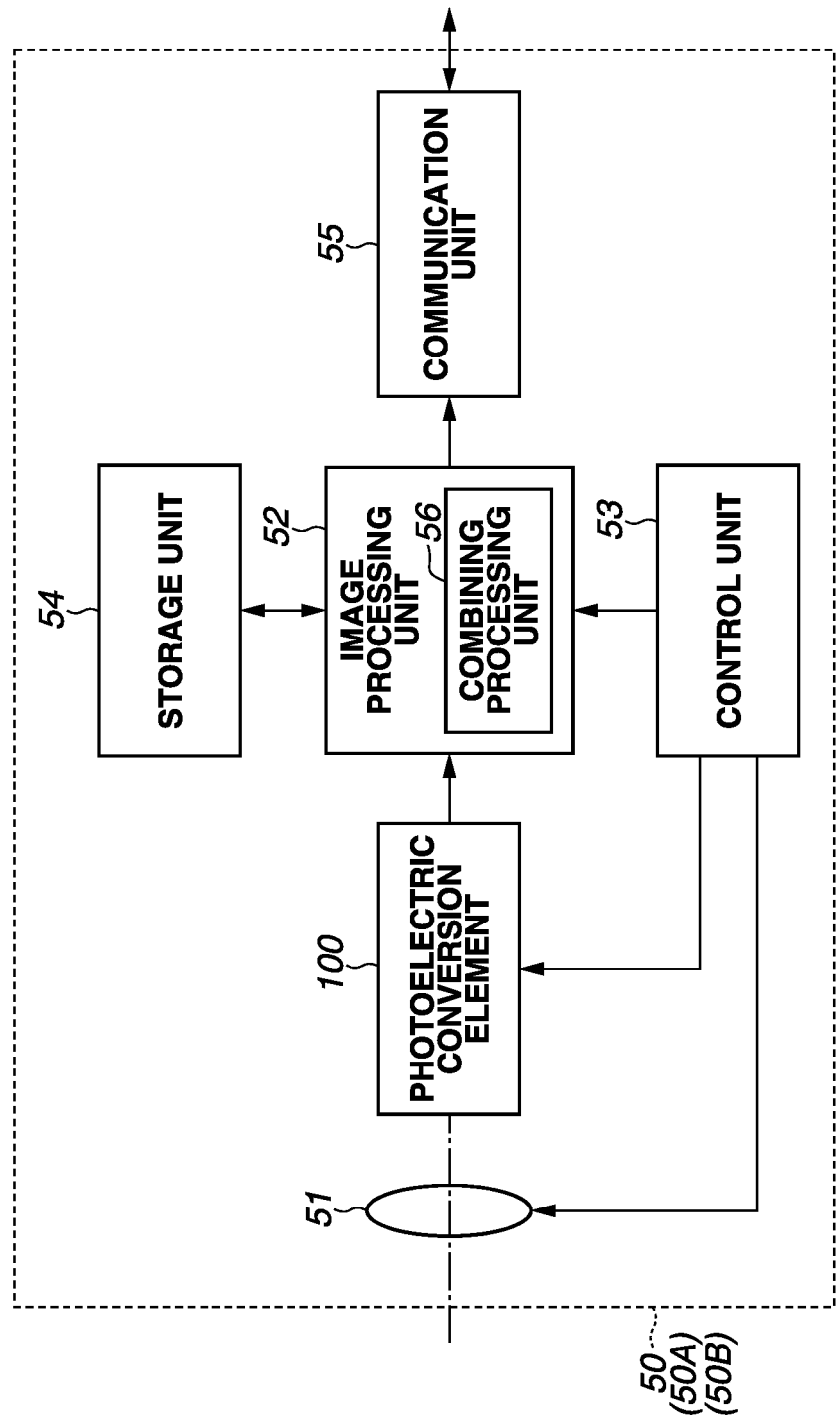
FIG. 1A is a block diagram illustrating a configuration of a photoelectric conversion apparatus.

First, with reference to FIG. 1A, the configuration of a photoelectric conversion apparatus 50 according to the first embodiment is described. The basic configurations of a photoelectric conversion apparatus 50A according to the second embodiment and a photoelectric conversion apparatus 50B according to the third embodiment are similar to that of the photoelectric conversion apparatus 50 according to the first embodiment.

<Configuration of Photoelectric Conversion Apparatus>

FIG. 1A is a block diagram of the photoelectric conversion apparatus 50. The photoelectric conversion apparatus 50 includes an image forming optical system 51, an image processing unit 52, a control unit 53, a storage unit 54, a communication unit 55, and a photoelectric conversion element 100. The image processing unit 52 includes a combining processing unit 56 (second generation unit).

The image forming optical system 51 includes a focus lens, a zoom lens, and a diaphragm. The image forming optical system 51 forms an optical image of an object and makes the formed optical image incident on an imaging surface of the photoelectric conversion element 100. The focus lens, the zoom lens, and the diaphragm included in the image forming optical system 51 are controlled by the control unit 53.

The photoelectric conversion element 100 captures the optical image formed by the image forming optical system 51. That is, the photoelectric conversion element 100 is an image capturing unit that captures an image of the object using a photoelectric conversion element. The image processing unit 52 performs a signal rearrangement process, a defective pixel correction process, a black level correction process, and a linearity correction process (described in the second embodiment) on signals read from the photoelectric conversion element 100, thereby generating a first image (a frame image) and a second image (a frame image). Then, the image processing unit 52 combines the first and second images, thereby generating a combined image (the combining of the images will be described below). Before combining the first and second images, the image processing unit 52 may adjust (change) digital gains applied to the first and second images. In the following description, the first image will occasionally be referred to as "an image of a first frame", and the second image will occasionally be referred to as "an image of a second frame". It can be said that the image processing unit 52 generates an image based on the image of the first frame and the image of the second frame.

The image processing unit 52 may perform a gamma correction process, a noise reduction process, and a data compression process on the generated combined image. In a case where the photoelectric conversion element 100 includes red, green, and blue (RGB) on-chip color filters, it is more desirable to perform a white balance correction process and a color conversion process on the generated combined image. Alternatively, after performing some of these processes on the first and second images, the image processing unit 52 may perform the combining process.

A central processing unit (CPU) or a microprocessor unit (MPU) as a computer is built into the control unit 53. The control unit 53 controls the operations of the components of the photoelectric conversion apparatus 50 based on a computer program stored in the storage unit 54. The control unit 53 also controls the length of an exposure period and the timing of a control signal CLK in each frame of the photoelectric conversion element 100 via a control pulse generation unit 115 (FIG. 3) of the photoelectric conversion element 100. "CLK" is the abbreviation for clock.

The storage unit 54 includes a recording medium such as a memory card, a hard disk, a read-only memory (ROM), or a random-access memory (RAM). The communication unit 55 includes a wireless or wired interface. The communication unit 55 outputs an image signal (the combined image) generated by the image processing unit 52 to an external apparatus of the photoelectric conversion apparatus 50 and also receives a signal from the external apparatus. For example, the combined image generated by the image processing unit 52 is transmitted from the communication unit 55 to an external apparatus (e.g., a terminal apparatus including a display) and displayed on the external apparatus.

The configuration illustrated in FIG. 1A is merely an example, and for example, the image processing unit 52 may be divided into blocks that perform a plurality of functions. A part or the entirety of the image processing unit 52 may be implemented as hardware. In a case where a part or the entirety of the image processing unit 52 is implemented as hardware, for example, a dedicated circuit may be automatically generated on a field-programmable gate array (FPGA) according to a program for achieving steps, using a predetermined compiler. Alternatively, a gate array circuit may be formed similarly to the FPGA, and the image processing unit 52 may be achieved as hardware. Yet alternatively, the image processing unit 52 may be achieved by an application-specific integrated circuit (ASIC).

The photoelectric conversion apparatus 50 has an image capturing function and therefore may be referred to as an "image capturing apparatus".

<Configuration of Photoelectric Conversion Element>

Figure 1B:
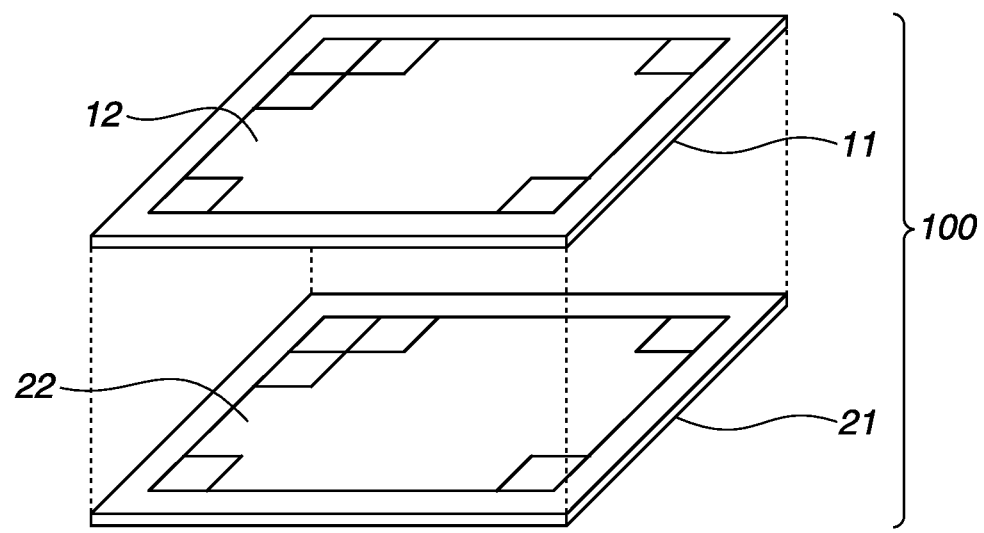
FIG. 1B is an exploded perspective view illustrating a photoelectric conversion element included in the photoelectric conversion apparatus.

FIG. 1B illustrates an example of the configuration of the photoelectric conversion element 100 included in the photoelectric conversion apparatus 50. The photoelectric conversion element 100 includes two laminated substrates (a sensor substrate 11 and a circuit substrate 21). That is, the photoelectric conversion element 100 has a laminated structure. The sensor substrate 11 and the circuit substrate 21 are electrically connected together. The sensor substrate 11 includes a pixel area 12. The circuit substrate 21 includes a circuit area 22 that processes a signal detected in the pixel area 12. Alternatively, the photoelectric conversion element 100 may have a non-laminated structure. For example, a component (the pixel area 12) included in the sensor substrate 11 and a component (the circuit area 22) included in the circuit substrate 21 may be placed on a common semiconductor layer.

<Configuration of Sensor Substrate>

Figure 2:
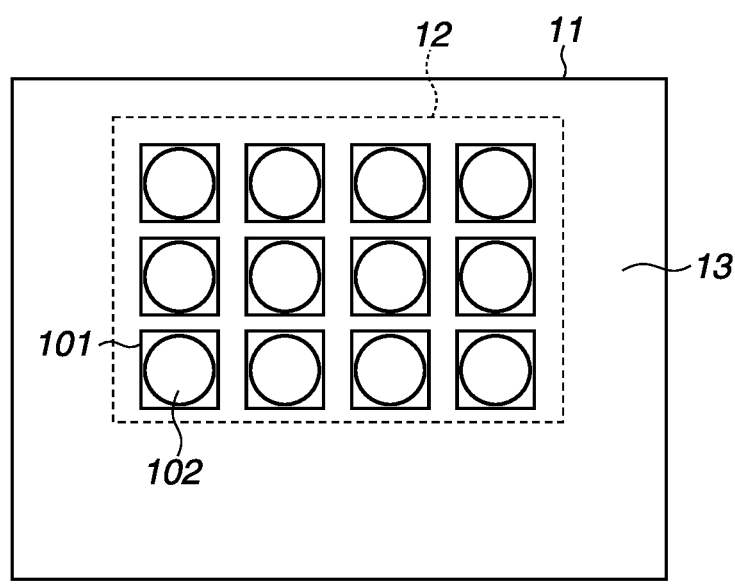
FIG. 2 is a diagram illustrating a sensor substrate.

FIG. 2 illustrates an example of the configuration of the sensor substrate 11. The pixel area 12 of the sensor substrate 11 includes pixels 101 two-dimensionally arranged in a plurality of rows and columns (a row direction and a column direction). In the following description, the plurality of pixels 101 that is two-dimensionally arranged will occasionally be referred to as a "pixel array". The pixel array in FIG. 2 is a 3-by-4 pixel array. Each pixel 101 includes a photoelectric conversion unit 102 including an avalanche photodiode (APD). As illustrated in FIG. 2, the sensor substrate 11 includes the pixel area 12 and a non-pixel area 13 around the pixel area 12. The number of rows and the number of columns of the pixel array forming the pixel area 12 are not limited to the number of rows and the number of columns illustrated in FIG. 2.

<Configuration of Circuit Substrate>

Figure 3:
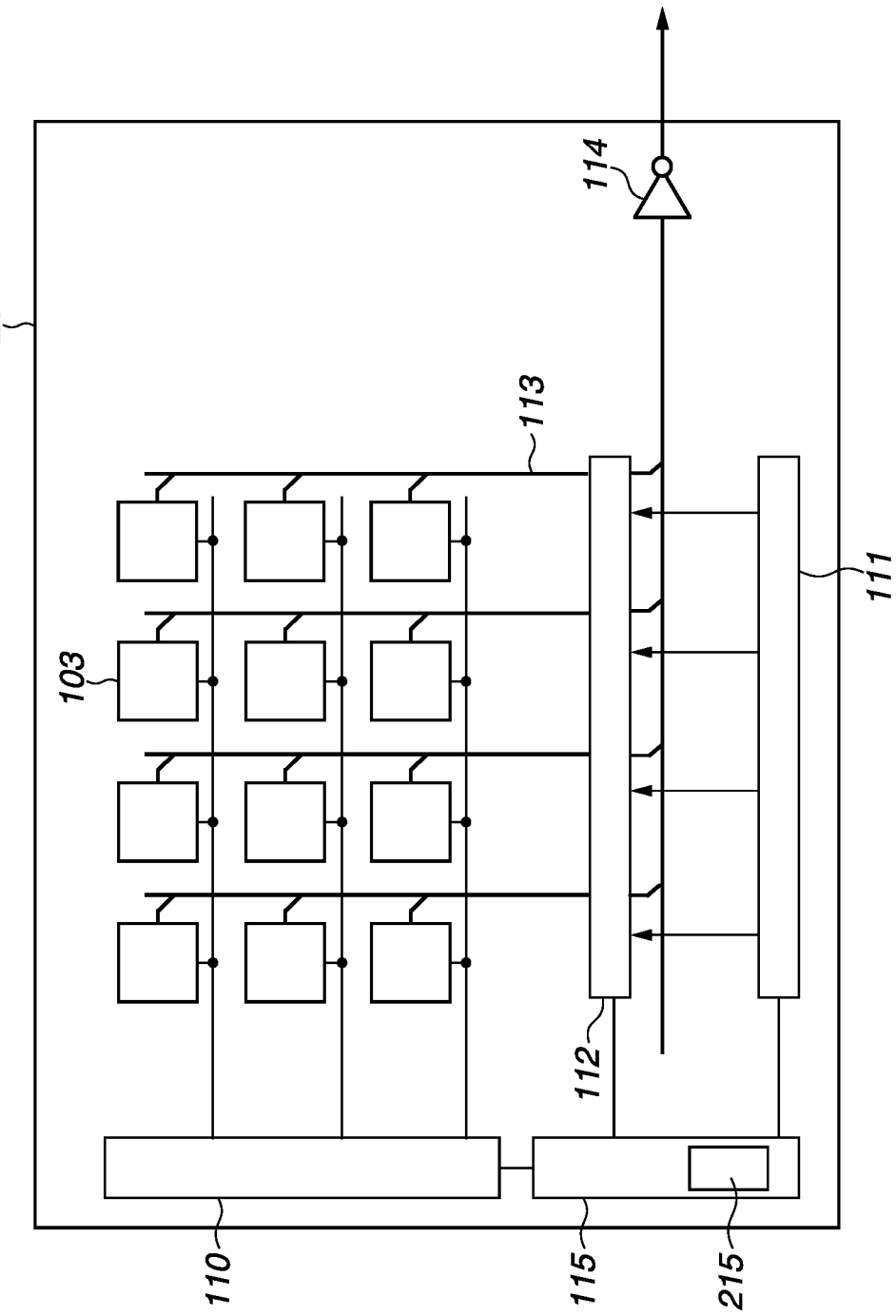
FIG. 3 is a diagram illustrating a circuit substrate.

FIG. 3 illustrates an example of the configuration of the circuit substrate 21. The circuit substrate 21 includes signal processing circuits 103 that process charges photoelectrically converted by the photoelectric conversion units 102 in FIG. 2, a vertical scanning circuit 110, a reading circuit 112, a control pulse generation unit 115 (first generation unit), a horizontal scanning circuit 111, and signal lines 113. Similarly to the pixel array, the signal processing circuits 103 are two-dimensionally arranged.

The vertical scanning circuit 110 receives a control pulse supplied from the control pulse generation unit 115 and supplies the control pulse to each pixel 101. The vertical scanning circuit 110 includes logic circuits such as a shift register and an address decoder.

The control pulse generation unit 115 includes a signal generation unit 215 that generates a control signal CLK for a switch 202. The signal generation unit 215 can change at least one of the cycle, the number of pulses, and the pulse width of a pulse signal (the control signal CLK) for controlling the switch 202. It is desirable that the control pulse generation unit 115 should include, for example, a frequency division circuit. Consequently, it is possible to perform simple control and prevent an increase in the number of elements.

The signal processing circuits 103 process signals output from the photoelectric conversion units 102 of the pixels 101. Each signal processing circuit 103 includes a counter circuit 211 (FIG. 4) and a memory. The memory holds a count value (a digital value) of the counter circuit 211. The photoelectric conversion apparatus 50 (the photoelectric conversion element 100) is basically driven by the control signal CLK, and therefore, it can be said that the photoelectric conversion apparatus 50 is clock-driven. The memory of the signal processing circuit 103 may be referred to as "an information holding unit (an information storage unit) of the signal processing circuit 103".

To read the digital values from the memories of the signal processing circuits 103 holding the digital values, the horizontal scanning circuit 111 inputs control pulses for sequentially selecting columns to the signal processing circuits 103.

The signal lines 113 extend in the column direction. To the signal lines 113, signals are output from signal processing circuits 103 corresponding to pixels 101 selected by the vertical scanning circuit unit 110 in a selected column. The signals output to the signal lines 113 are output to outside the photoelectric conversion element 100 via an output circuit 114.

<Connection Between Sensor Substrate and Circuit Substrate>

As illustrated in FIGS. 2 and 3, the plurality of signal processing circuits 103 is placed in an area overlapping the pixel area 12 in a planar view. Then, the vertical scanning circuit unit 110, the horizontal scanning circuit unit 111, the reading circuit 112, the output circuit 114, and the control pulse generation unit 115 are placed to overlap the area between the outer periphery of the sensor substrate 11 and the outer periphery of the pixel area 12 in the planar view. That is, the vertical scanning circuit 110, the horizontal scanning circuit 111, the reading circuit 112, the output circuit 114, and the control pulse generation unit 115 are located in an area overlapping the non-pixel area 13 in the planar view. A single signal processing circuit 103 corresponds to a single photoelectric conversion unit 102.

The placement of the signal lines 113, the placement of the reading circuit 112, and the placement of the output circuit 114 are not limited to the placement illustrated in FIG. 3. For example, the signal lines 113 may extend in the row direction, and the reading circuit 112 may be placed at the extension destinations of the signal lines 113. The signal processing circuits 103 do not necessarily need to be provided one by one for all the photoelectric conversion units 102 (the pixels 101), and a single signal processing circuit 103 may be shared by a plurality of photoelectric conversion units 102 and sequentially perform signal processing.

<Equivalent Circuit of Pixel>

Figure 4:
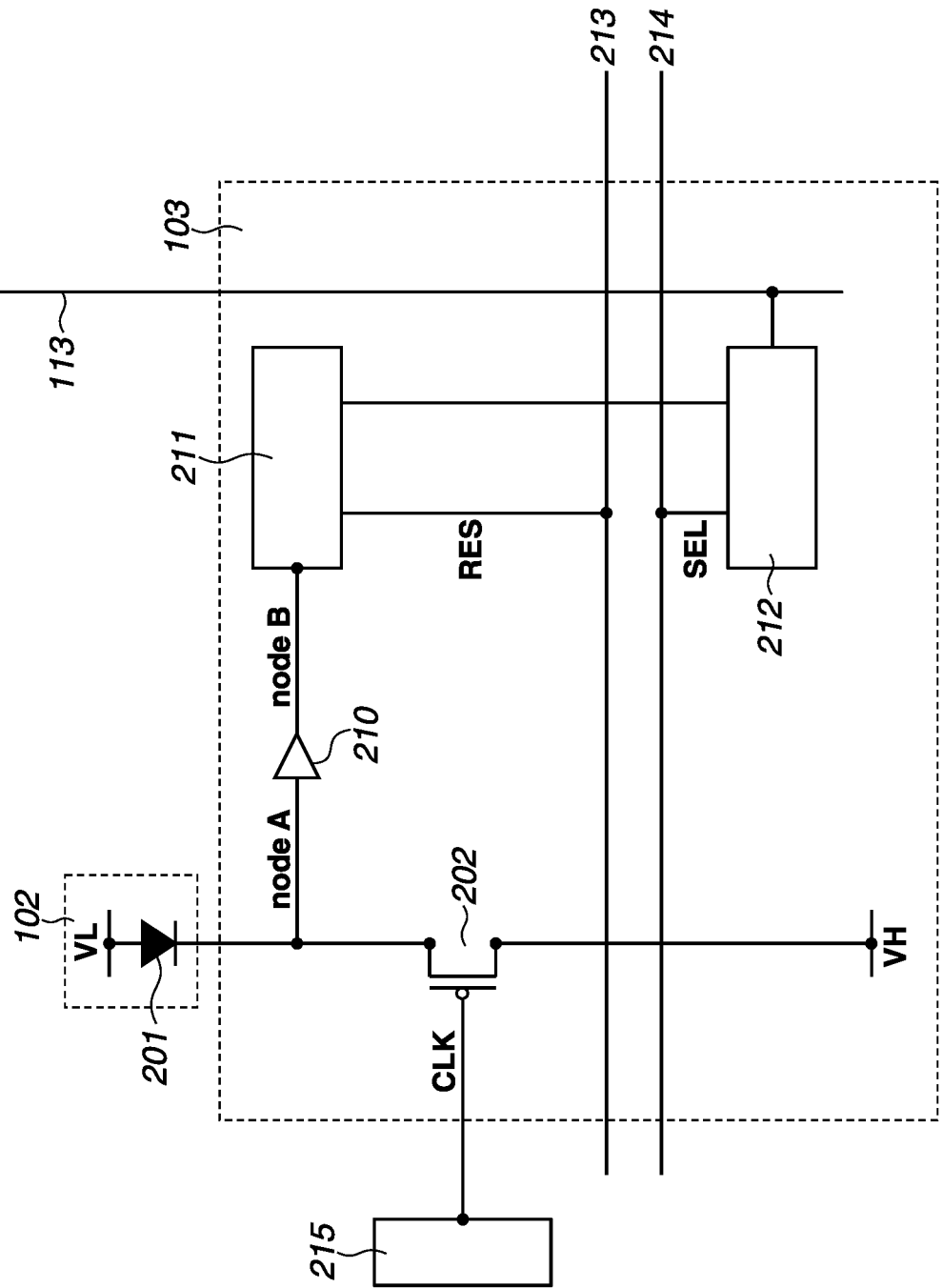
FIG. 4 is a diagram illustrating an equivalent circuit corresponding to a pixel of the photoelectric conversion apparatus.

FIG. 4 is a diagram illustrating an equivalent circuit of a single pixel 101 (a single photoelectric conversion unit 102) among the plurality of pixels 101 illustrated in FIG. 2 and a signal processing circuit 103 (FIG. 3) corresponding to the pixel 101.

The photoelectric conversion unit 102 includes an APD 201. The APD 201 generates a charge pair according to incident light through photoelectric conversion. One of two nodes of the APD 201 is connected to a power supply line to which a driving voltage VL (a first voltage) is supplied. The other node of the APD 201 is connected to a power supply line to which a driving voltage VH (a second voltage) higher than the voltage VL is supplied. In FIG. 4, one of the nodes of the APD 201 is an anode, and the other node of the APD 201 is a cathode. To the anode and the cathode of the APD 201, reverse bias voltages that cause the APD 201 to perform an avalanche multiplication operation are supplied. The reverse bias voltages are supplied, whereby the charges generated by the incident light cause avalanche multiplication, and an avalanche current is generated.

In a case where the reverse bias voltages are supplied, there are a Geiger mode for causing the APD 201 to operate by making the difference in voltage between the anode and the cathode greater than a breakdown voltage, and a linear mode for causing the APD 201 to operate by bringing the difference in voltage between the anode and the cathode close to the breakdown voltage or reducing the difference in voltage to less than the breakdown voltage. The APD 201 caused to operate in the Geiger mode is referred to as a "single-photon avalanche diode (SPAD)". In the case of the SPAD, for example, the voltage VL (the first voltage) is −30 V, and the voltage VH (the second voltage) is 1 V.

The signal processing circuit 103 includes a switch 202, a waveform shaping unit 210, a counter circuit 211, and a selection circuit 212.

The switch 202 is connected to the power supply line to which the driving voltage VH is supplied and one of the nodes, namely the anode and the cathode, of the APD 201. Then, the switch 202 switches a resistance value between the APD 201 and the power supply line to which the driving voltage VH is supplied. In a case where the resistance value is switched, it is desirable to change the resistance value by 10 times or more, and it is more desirable to change the resistance value by 100 times or more. Hereinafter, the resistance value being low will occasionally be referred to as "the turning on of the switch 202", and the resistance value being high will occasionally be referred to as "the turning off of the switch 202". The switch 202 functions as a quench element. The switch 202 serves to function as a load circuit (a quench circuit) when a signal is multiplied by avalanche multiplication, and reduce a voltage supplied to the APD 201, thereby preventing the avalanche multiplication (a quench operation). The switch 202 also serves to apply a current corresponding to the voltage dropped by the quench operation, thereby returning the voltage supplied to the APD 201 to the driving voltage VH (a recharge operation).

The switch 202 can be composed of a metal-oxide-semiconductor (MOS) transistor. FIG. 4 illustrates a case where the switch 202 is composed of a positive-MOS (PMOS) transistor. The signal generation unit 215 supplies (inputs) a control signal CLK to the switch 202. The control signal CLK is applied to the gate electrode of the MOS transistor composing the switch 202. In the present embodiment, a voltage applied to the gate electrode of the switch 202 is controlled, thereby controlling the turning on and off of the switch 202.

The waveform shaping unit 210 shapes a change in the voltage of the cathode of the APD 201 obtained when a photon is detected. Then, the waveform shaping unit 210 outputs a pulse signal. A node on the input side of the waveform shaping unit 210 is a node nodeA, and a node on the output side of the waveform shaping unit 210 is a node nodeB. According to whether a voltage input to the node nodeA is greater than or equal to a predetermined value or is lower than the predetermined value, the waveform shaping unit 210 changes a voltage output from the node nodeB. This process is described with reference to FIG. 5. In FIG. 5, if the voltage input to the node nodeA becomes a voltage greater than or equal to a determination threshold, the voltage output from the node nodeB switches to a low level. Then, if the voltage input to the node nodeA becomes a voltage lower than the determination threshold, the voltage output from the node nodeB switches to a high level.

The waveform shaping unit 210 is, for example, an inverter circuit. Although the waveform shaping unit 210 is composed of a single inverter in FIG. 4, the waveform shaping unit 210 may be composed of a circuit where a plurality of inverters is connected in series, or may be composed of another circuit having a waveform shaping effect.

The counter circuit 211 counts pulse signals output from the waveform shaping unit 210 and holds the count value. If a control pulse RES is supplied to the counter circuit 211 via a driving line 213, the signals held in the counter circuit 211 are reset.

To the selection circuit 212, a control pulse SEL is supplied from the vertical scanning circuit unit 110 in FIG. 3 via a driving line 214 in FIG. 4 (not illustrated in FIG. 3), thereby switching electrical connection and disconnection between the counter circuit 211 and the signal line 113. The selection circuit 212 includes, for example, a buffer circuit for outputting a signal. An output signal OUT illustrated in FIG. 5 is an output signal from the pixel 101.

A switching element such as a transistor may be placed between the switch 202 and the APD 201 or between the photoelectric conversion unit 102 and the signal processing circuit 103, thereby switching electrical connection and disconnection. Similarly, whether to supply the voltage VH or the voltage VL to the photoelectric conversion unit 102 may be electrically switched using a switching element such as a transistor.

<Clock Driving>

Although the quench operation and the recharge operation using the switch 202 can be performed according to avalanche multiplication in the APD 201, a photon may not be determined as the output signal ("OUT" in FIG. 5) depending on the detection timing of the photon. For example, a case is assumed where avalanche multiplication occurs in the APD 201, the voltage input to the node nodeA switches to the low level, and the recharge operation is performed. Generally, the determination threshold for the waveform shaping unit 210 is set to a voltage higher than the difference in voltage that causes avalanche multiplication in the APD 201. If a photon is incident in the state where the voltage of the node nodeA is lower than the determination threshold by the recharge operation and when the voltage of the APD 201 enables avalanche multiplication, avalanche multiplication occurs in the APD 201, and the voltage of the node nodeA decreases. That is, since the voltage of the node nodeA decreases at a voltage lower than the determination threshold, the voltage output from the node nodeB does not change (does not switch to the high level) even though the photon is detected. Thus, the photon is not determined as the output signal OUT even though avalanche multiplication occurs. Particularly under a high illuminance, photons are successively incident in a short period, and therefore, each photon is less likely to be determined as the output signal OUT. Consequently, even though the illuminance is high, the number of pulse signals output from the node nodeB is small, and a discrepancy is likely to occur between the actual number of incident photons and the output signal OUT.

In response to this, in the present embodiment, the turning on and off of the switch 202 are switched by applying the control signal CLK to the switch 202, whereby, even in a case where photons are successively incident on the APD 201 in a short time, each photon can be determined as the output signal OUT. This process is described with reference to FIG. 5. FIG. 5 illustrates a case where the control signal CLK is a pulse signal in a repeated cycle.

FIG. 5 is a diagram schematically illustrating the relationships between the control signal CLK for the switch 202, the voltage of the node nodeA, the voltage of the node nodeB, and the output signal OUT. In the output signal OUT, n, n+1, and n+2 represent the count value of the counter circuit 211. In the photoelectric conversion apparatus 50 (the photoelectric conversion element 100) according to the present embodiment, when the control signal CLK is at a high level, the driving voltage VH is less likely to be supplied to the APD 201. When the control signal CLK is at a low level, the driving voltage VH is supplied to the APD 201. The control signal CLK being at the high level means that the voltage value of the control signal CLK is 1 V, for example. The control signal CLK being at the low level means that the voltage value of the control signal CLK is 0 V, for example. In a case where the control signal CLK is at the high level, the switch 202 is turned off. In a case where the control signal CLK is at the low level, the switch 202 is turned on. The resistance value of the switch 202 in a case where the control signal CLK is at the high level is higher than the resistance value of the switch 202 in a case where the control signal CLK is at the low level. In a case where the control signal CLK is at the high level, and even if avalanche multiplication occurs in the APD 201, the recharge operation is less likely to be performed. Thus, the voltage supplied to the APD 201 is a voltage less than or equal to the breakdown voltage of the APD 201. Thus, the avalanche multiplication operation in the APD 201 stops.

At a time t1, the control signal CLK changes from the high level to the low level, the switch 202 is turned on, and the recharge operation of the APD 201 is started. Consequently, the voltage of the cathode of the APD 201 transitions to a high level. Then, the difference in voltage between the voltages applied to the anode and the cathode of the APD 201 reaches a value that enables avalanche multiplication. The voltage of the cathode is the same as that of the node nodeA. Thus, when the voltage of the cathode transitions from a low level to the high level, then at a time t2, the voltage of the node nodeA becomes greater than or equal to the determination threshold. At this time, a pulse signal output from the node nodeB is inverted and changes from a high level to a low level. If the recharge is completed, the difference in voltage between the driving voltages VH and VL is applied to the APD 201. Then, the control signal CLK switches to the high level, and the switch 202 is turned off.

Next, at a time t3, if a photon is incident on the APD 201, avalanche multiplication occurs in the APD 201, an avalanche multiplication current flows through the switch 202, and the voltage of the cathode drops. That is, the voltage of the node nodeA drops. If the voltage of the node nodeA becomes lower than the determination threshold during the drop of the voltage of the node nodeA, the voltage of the node nodeB switches from the low level to the high level. That is, a portion of the output waveform of the node nodeA that exceeds the determination threshold is waveform-shaped by the waveform shaping unit 210 and output as a waveform-shaped signal (a pulse signal) from the node nodeB. Then, the waveform-shaped signal is counted by the counter circuit 211, and a counter signal (the count value) output from the counter circuit 211 increases by one bit (the output signal OUT changes from n to n+1).

In the example of FIG. 5, a photon is incident on the APD 201 between the time t3 and a time t4, but the switch 202 is in the off state, and the voltage applied to the APD 201 is not the difference in voltage that enables avalanche multiplication. Thus, the voltage level of the nodeA does not exceed the determination threshold.

At the time t4, the control signal CLK changes from the high level to the low level, and the switch 202 is turned on. Accordingly, a current that compensates for the voltage drop flows through the node nodeA from the driving voltage VL, and the voltage of the node nodeA transitions (rises) to the original voltage level. At a time t5 during this rise in the voltage level, the voltage of the node nodeA becomes greater than or equal to the determination threshold. Thus, the pulse signal from the node nodeB is inverted and changes from the high level to the low level.

At a time t6, the node nodeA reaches the original voltage level and becomes static, and the control signal CLK switches from the low level to the high level. Also at and after the time t6, the voltages of the nodes nodeA and nodeB and the signal line 113 change according to the control signal CLK and the incidence of a photon as described from the time t1 to the time t6.

As described above, the turning on and off of the switch 202 are switched by applying the control signal CLK to the switch 202, whereby it is possible to control the recharge frequency of the APD 201. As will be described below, in the photoelectric conversion apparatus 50 according to the present embodiment, the timing of the control signal CLK applied to the switch 202 is controlled, thereby improving image quality under a dark environment.

In the specification, driving using the control signal CLK (a clock signal) as described above is occasionally referred to as "clock driving".

<Crosstalk>

Figure 6A:
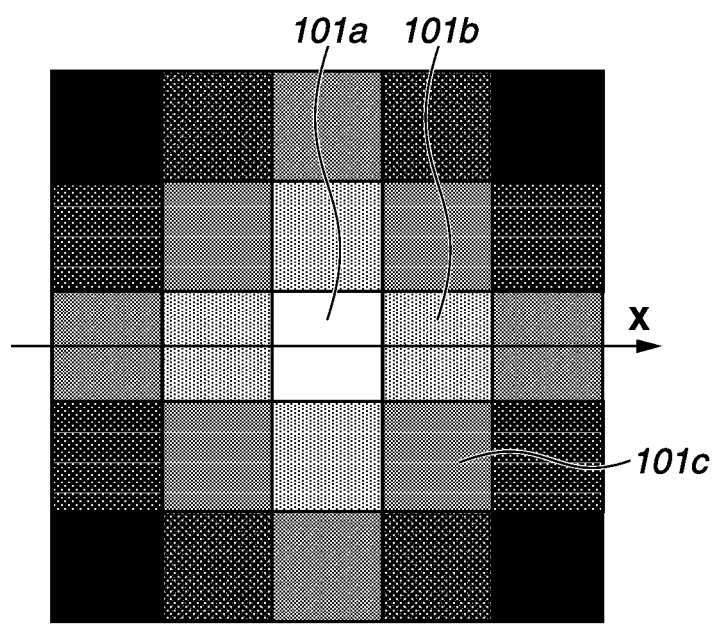
FIG. 6A is a diagram illustrating crosstalk between pixels.
Figure 6B:
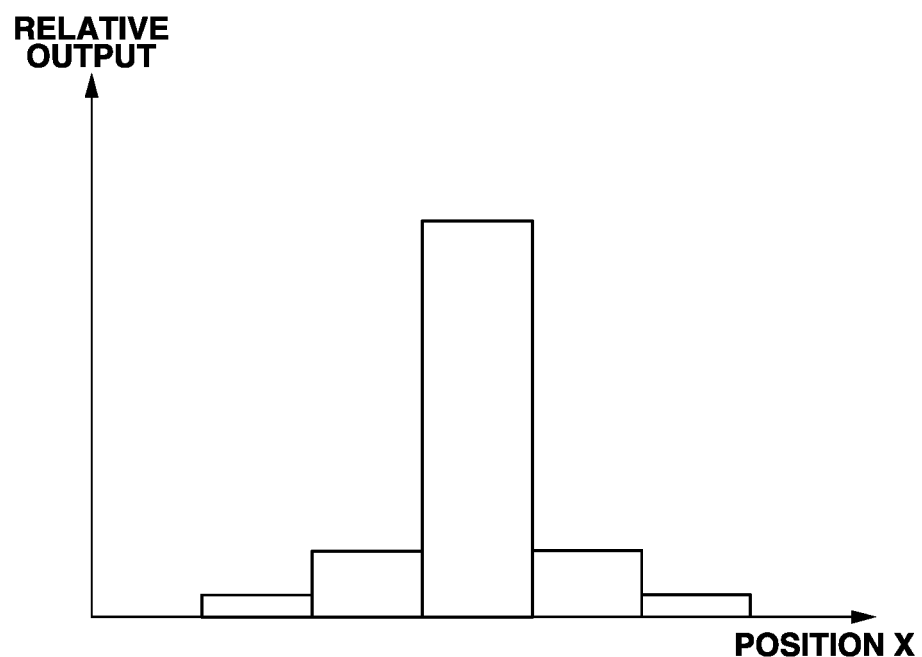
FIG. 6B is a diagram illustrating a relative output at a position in an X-direction in FIG. 6A.

With reference to FIGS. 6A and 6B, crosstalk between pixels 101 in the photoelectric conversion apparatus 50 according to the first embodiment is described. In FIG. 6A, a description is given using a 5-by-5 pixel array. FIG. 6A illustrates the output distribution of pixels in a 5-by-5 pixel array in the pixel area 12. The horizontal direction in FIG. 6A is an X-axis direction. FIG. 6B illustrates a relative output value on the X-axis in FIG. 6A. A pixel 101a at the center of the 25 pixels is a flaw pixel. In the specification, a pixel in which the count value is too great for the number of incident photons under the influence of a dark current generated due to a defect level of the photoelectric conversion unit 102 is referred to as a "flaw pixel". As illustrated in FIGS. 6A and 6B, if the flaw pixel 101a is present in the pixel area 12, the output levels of a pixel 101b and a pixel 101c placed near the pixel 101a increase regardless of the illuminance of incident light. It is considered that this is because charges are generated also in the adjacent pixels 101b and 101c due to avalanche light emission in the pixel 101a, and avalanche multiplication occurs in the adjacent pixels 101b and 101c due to the generated charges. That is, avalanche light emission is likely to occur due to the flaw in the pixel 101a. This causes clustered flaws, increases the relative outputs of the pixels 101b and 101c near the pixel 101a, and decreases image quality. In the photoelectric conversion apparatus 50 according to the first embodiment, as will be described below, the timing of the control signal CLK applied to the switch 202 is adjusted, thereby preventing a decrease in image quality.

COMPARATIVE EXAMPLE

With reference to FIGS. 7A and 7B, FIGS. 8A and 8B, and FIGS. 9A to 9D, a description is given of a photoelectric conversion apparatus (a comparative example) in which the timing of the control signal CLK applied (supplied) to the switch 202 is always constant. Then, with reference to FIGS. 10A and 10B, FIGS. 11A and 11B, and FIGS. 12A to 12D, a description is given of the photoelectric conversion apparatus 50 according to the first embodiment in which the timing of the control signal CLK is controlled (adjusted).

The configuration of the photoelectric conversion apparatus according to the comparative example is the same as that of the photoelectric conversion apparatus 50 according to the first embodiment, except that the timing of the control signal CLK is not adjusted.

FIG. 7A illustrates a timing chart of the control signal CLK and avalanche light emission in the pixel 101*a* during one frame period when high-illuminance image capturing is performed (under a bright environment) by the photoelectric conversion apparatus according to the comparative example. FIG. 7B illustrates a timing chart of the control signal CLK and avalanche light emission in the pixel 101*a* during one frame period when low-illuminance image capturing is performed (under a dark environment) by the photoelectric conversion apparatus according to the comparative example. In the photoelectric conversion apparatus according to the comparative example, the control signal CLK is supplied to the switch 202 at a constant timing in either of the case where high-illuminance image capturing is performed and the case where low-illuminance image capturing is performed.

"One frame period" refers to, for example, the period from a rising edge of a pulse signal (vertical synchronization signal) VD to a next rising edge of the pulse signal VD. One frame period is, for example, the period when the vertical scanning circuit unit 110 scans from the pixels 101 in the first row disposed in the pixel area 12 to the pixels 101 in the last row. That is, one frame period is the period from when the pulse signal VD as the vertical synchronization signal switches to a high level once to when the pulse signal VD switches to the high level next. During one frame period, it is not necessary to scan the pixels 101 in all the rows from the pixels 101 in the first row to the pixels 101 in the last row. For example, in a case where the vertical scanning circuit unit 110 scans by thinning out some of all the rows of the pixel array, one frame period is the period from when the vertical scanning circuit unit 110 scans in one direction from a certain row to when the vertical scanning circuit unit 110 finishes scanning the last row. Alternatively, in a case where the vertical scanning circuit unit 110 scans by thinning out a certain row and then scans the thinned-out row, one frame period may be the period until the vertical scanning circuit unit 110 finishes scanning the thinned-out row.

It is desirable to reset the count value of the counter circuit 211 of the signal processing circuit 103 between frame periods. The timing of the reset of the count value may be such that the count value is reset in common for all the pixels or sequentially reset with respect to each pixel row.

In the present embodiment, an "exposure period" refers to a period in the state where light can be incident on the APD 201, and the APD 201 and the signal processing circuit 103 can read signals. A "non-exposure period" refers to a period in the state where the APD 201 in the pixel area 12 is shielded from light, and light is not incident on the APD 201.

"The state where light can be incident" refers to the state where the APD 201 is not shielded from light by a mechanical or electrical shutter. "The period in the state where the APD 201 and the signal processing circuit 103 can read signals" refers to the period when the APD 201 and the signal processing circuit 103 are not intentionally turned off.

In the specification, the period of the quench operation of the APD 201 does not correspond to this period, and the period of the quench operation is the period when signals can be read. The exposure period and the non-exposure period may be defined not only by opening and closing the shutter, but also by adjusting a bias applied to the APD 201 and changing whether a photon signal can be acquired.

In FIGS. 7A and 7B, "dark events" indicate the generation timing of a photon due to avalanche light emission in the flaw pixel 101*a* in FIG. 6A. In the "dark events", the timings of rising edges indicated by a solid line and a dashed line in the vertical direction are the generation timings of photons. Although both the solid line and the dashed line indicate the generation timings of photons, the dashed line indicates the generation timing of a photon that is not counted as a signal. This is because, as described above, the voltage of the node nodeA decreases before the voltage of the node nodeA becomes greater than or equal to the determination threshold, and the photon is not determined as a signal. FIGS. 7A and 7B do not illustrate avalanche light emission that occurs due to the incident of light from the object on the APD 201, and illustrate only avalanche light emission caused by dark events that occurs due to a trap level of the flaw pixel 101*a*.

"Dark counts" indicate a count operation of the counter circuit 211 of the pixel 101*a*. When the voltage of the control signal CLK is at the low level, the recharge operation of the APD 201 is performed. Thus, after the recharge operation is performed, and if a charge is avalanche-multiplied by the APD 201, the charge is determined as a signal, and the number of counts of the counter circuit 211 increases by one.

"Crosstalk events" indicate the timing when crosstalk occurs in pixels near the pixel 101*a*. Since crosstalk occurs at a random timing, FIGS. 7A and 7B illustrate examples of the timing.

Figure 8A:
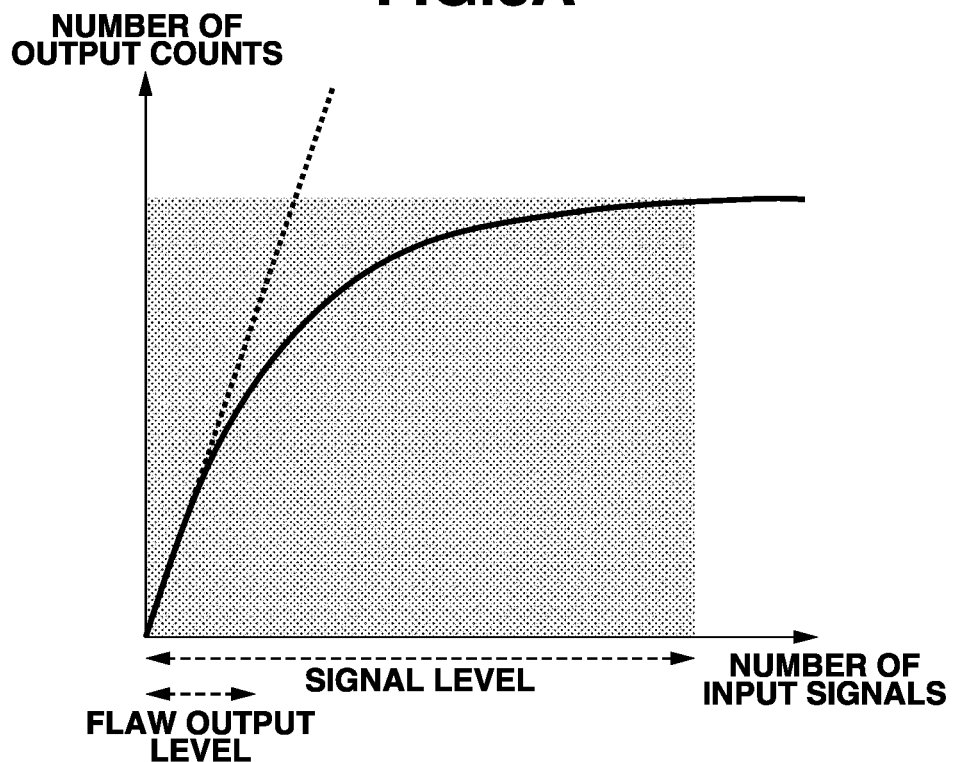
FIG. 8A is a diagram illustrating the number of output counts according to the comparative example when high-illuminance image capturing is performed.
Figure 8B:
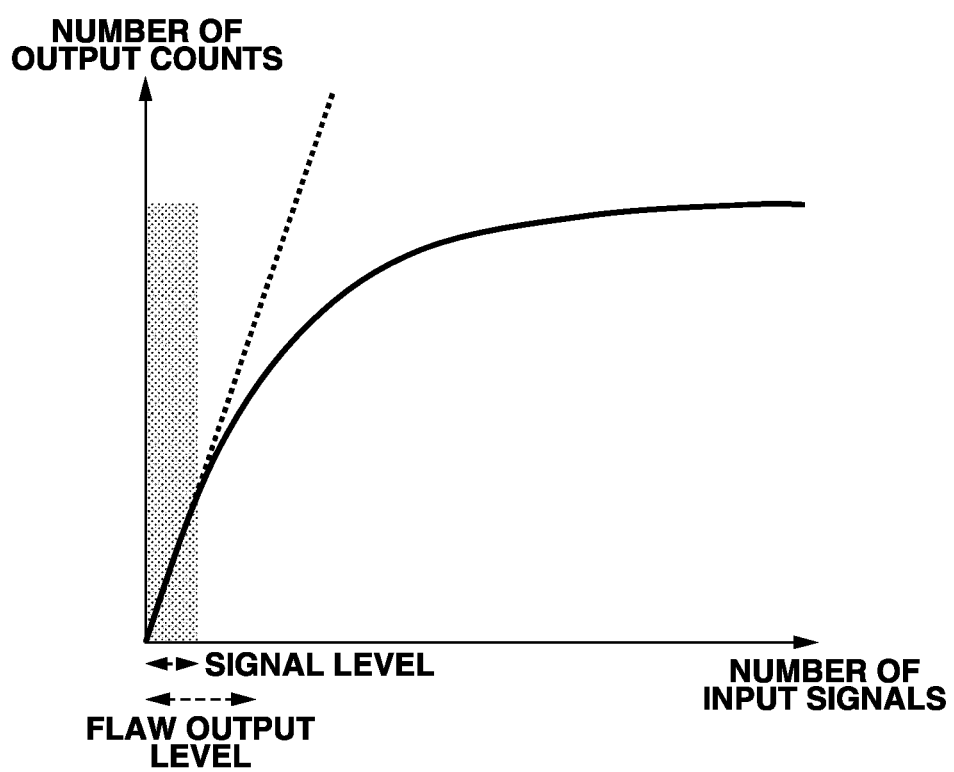
FIG. 8B is a diagram illustrating the number of output counts according to the comparative example when low-illuminance image capturing is performed.

FIG. 8A illustrates the relationship between the number of incident photons (the number of input signals) and the number of output counts per pixel in FIG. 7A. FIG. 8B illustrates the relationship between the number of incident photons and the number of output counts per pixel in FIG. 7B. In each of FIGS. 8A and 8B, a curve indicates the number of output counts.

As illustrated in FIG. 8A, when high-illuminance image capturing is performed, a flaw output level is low relative to a signal level. On the other hand, as illustrated in FIG. 8B, when low-illuminance image capturing is performed, there is a case where the flaw output level is high relative to the signal level. The flaw output level is a level based on the "dark counts".

Figure 9A:
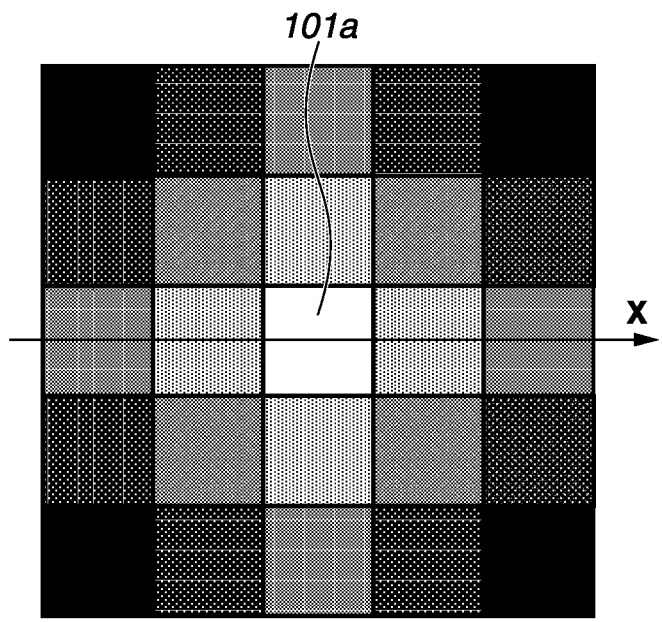
FIG. 9A is a diagram illustrating an influence of crosstalk between pixels according to the comparative example.
Figure 9B:
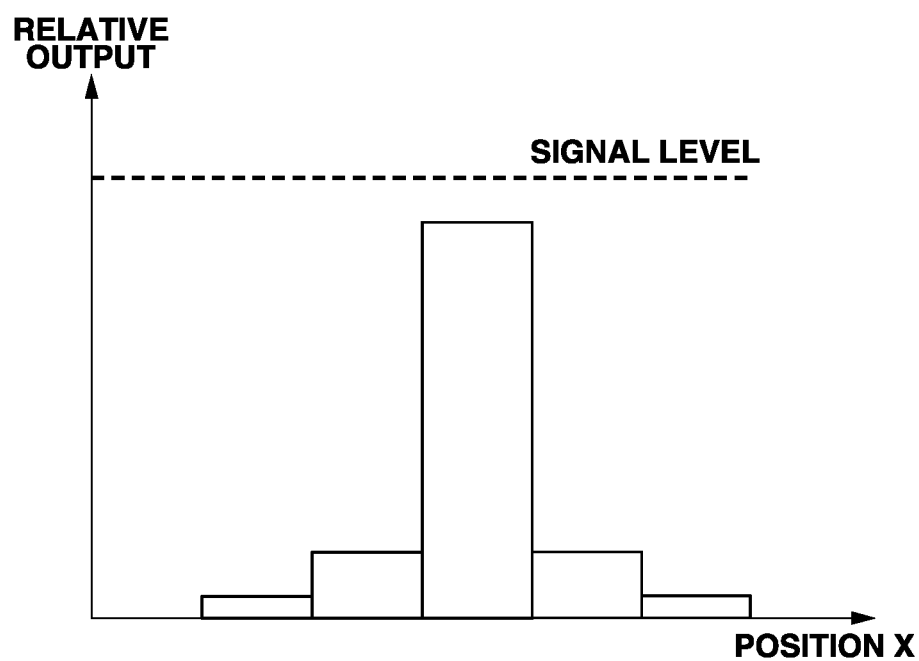
FIG. 9B is a diagram illustrating the influence of the crosstalk between the pixels according to the comparative example.
Figure 9C:
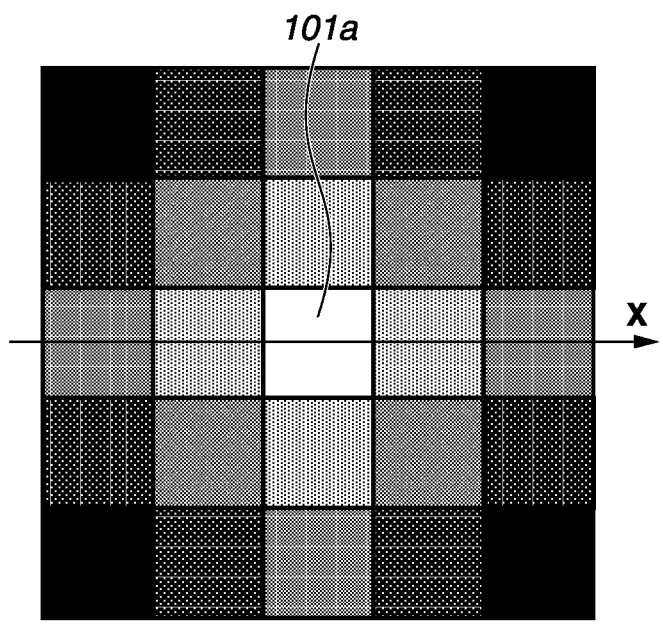
FIG. 9C is a diagram illustrating the influence of the crosstalk between the pixels according to the comparative example.
Figure 9D:
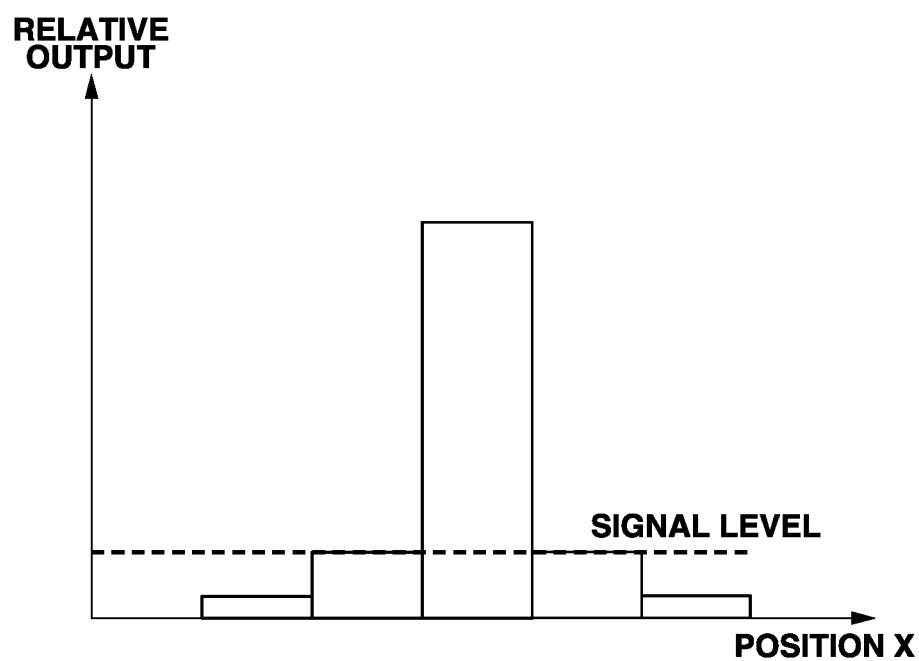
FIG. 9D is a diagram illustrating the influence of the crosstalk between the pixels according to the comparative example.

FIG. 9A is a diagram illustrating the output distribution of the pixel 101*a* and pixels near the pixel 101*a* in the 5-by-5 pixel array when high-illuminance image capturing is performed. FIG. 9B illustrates the relative output value on the X-axis in FIG. 9A. FIG. 9C is a diagram illustrating the output distribution of the pixel 101*a* and the pixels near the pixel 101*a* in the 5-by-5 pixel array when low-illuminance image capturing is performed. FIG. 9D illustrates the relative output value on the X-axis in FIG. 9C. FIGS. 9B and 9D illustrate the signal level (FIGS. 8A and 8B) when high-illuminance image capturing and low-illuminance image capturing, respectively, are performed. When high-illuminance image capturing is performed, the relative output value of the signal level is higher than the relative output value of the pixel 101*a*. Thus, an abnormal output of the pixel 101*a* based on a defect such as a flaw is less likely to be conspicuous. In contrast, when low-illuminance image capturing is performed, the relative output value of the signal level is lower than the relative output value of the pixel 101*a*. Thus, an abnormal output of the pixel 101*a* is conspicuous. Thus, when low-illuminance image capturing is performed, a decrease in image quality caused by a signal generated due to crosstalk is likely to occur.

<Photoelectric Conversion Apparatus According to Present Embodiment>

Accordingly, in the photoelectric conversion apparatus 50 according to the present embodiment, when low-illuminance image capturing is performed, the timing of the control signal CLK is controlled, thereby preventing a decrease in image quality under the influence of the flaw pixel 101*a*. In the following description, components similar to those of the photoelectric conversion apparatus according to the comparative example will occasionally be designated by the same signs and not be described.

Figure 10A:
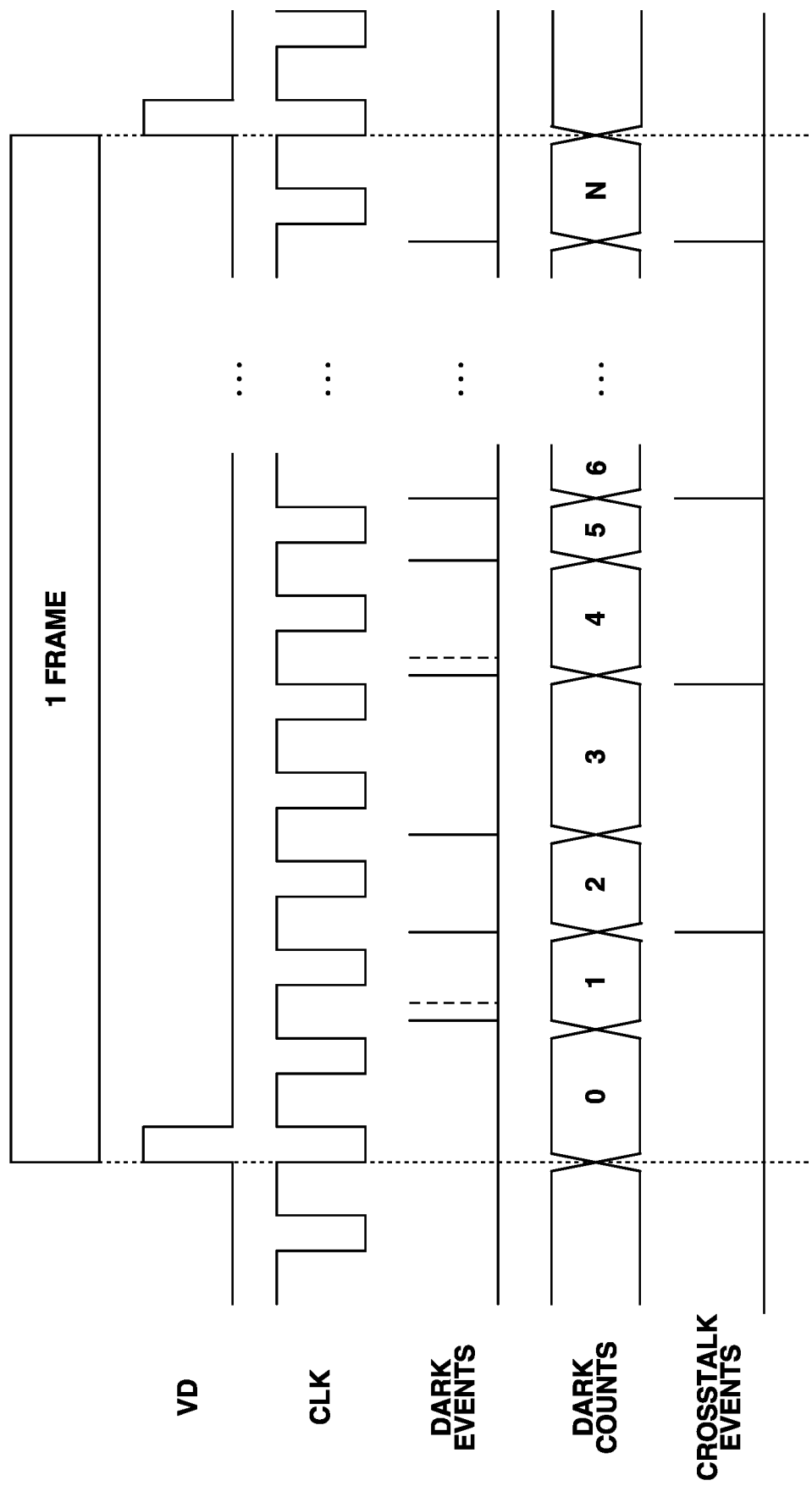
FIG. 10A is a timing chart of a photoelectric conversion apparatus according to a first embodiment.

FIG. 10A illustrates a timing chart of the control signal CLK and avalanche light emission in the pixel 101*a* during one frame period when high-illuminance image capturing is performed by the photoelectric conversion apparatus 50 according to the present embodiment. FIG. 10B illustrates a timing chart of the control signal CLK and avalanche light emission in the pixel 101*a* during one frame period when low-illuminance image capturing is performed by the photoelectric conversion apparatus 50 according to the present embodiment.

When low-illuminance image capturing is performed, the photoelectric conversion apparatus 50 according to the present embodiment combines the first image acquired in the first frame (the image of the first frame) and the second image acquired in the second frame (the image of the second frame), thereby generating the combined image. In the present embodiment, the number of pulse signals of the control signal CLK during one frame period in the second frame is smaller than the number of pulse signals of the control signal CLK during one frame period in the first frame. The number of pulse signals of the control signal CLK during one frame period in the second frame is also smaller than the number of pulse signals of the control signal CLK during one frame period when high-illuminance image capturing is performed. That is, in the present embodiment, the number of pulse signals of the control signal CLK is adjusted according to the image capturing illuminance.

With such a configuration, when low-illuminance image capturing is performed, an abnormal output of the flaw pixel 101*a* is less likely to be detected. Thus, it is possible to prevent a decrease in image quality compared to the conventional photoelectric conversion apparatus.

In the following description, the number of pulse signals of the control signal CLK during one frame period in the first frame when low-illuminance image capturing is performed is equal to the number of pulse signals of the control signal CLK during one frame period when high-illuminance image capturing is performed. That is, the number of pulse signals of the control signal CLK in FIG. 10A indicates the number of pulse signals of the control signal CLK during one frame period in the first frame when low-illuminance image capturing is performed. The number of pulse signals of the control signal CLK in FIG. 10B indicates the number of pulse signals of the control signal CLK during one frame period in the second frame when low-illuminance image capturing is performed. The number of pulse signals of the control signal CLK in FIG. 10A is not adjusted or controlled, and therefore is the same as that in the comparative example (FIG. 7A).

A description will be given below of an example where the number of pulse signals of the control signal CLK during one frame period in the first frame when low-illuminance image capturing is performed is different from the number of pulse signals of the control signal CLK during one frame period when high-illuminance image capturing is performed.

<Length of Exposure Period>

The exposure periods in the first and second frames may be different from each other. In the first embodiment, however, a case is described where the exposure periods in the first and second frames are equal to each other. A description will be given below of an example where the exposure periods in the first and second frames are different from each other.

<Number of Pulse Signals of Control Signal CLK>

The smaller the ratio of the number of pulse signals of the control signal CLK per unit time (e.g., one frame period) in the second frame to the number of pulse signals of the control signal CLK per unit time in the first frame is, the more a decrease in image quality when low-illuminance image capturing is performed can be prevented, which is desirable. Specifically, it is desirable that the number of pulse signals of the control signal CLK per unit time (e.g., one frame period) in the second frame should be a half (one-half) or less of the number of pulse signals of the control signal CLK per unit time in the first frame. It is more desirable that the number of pulse signals of the control signal CLK per unit time in the second frame should be one-eighth or less of the number of pulse signals of the control signal CLK per unit time in the first frame.

<Illuminance and Number of Pulse Signals of Control Signal CLK>

It is more desirable to change the number of pulse signals of the control signal CLK per unit time in each of the first and second frames according to the illuminance of the image capturing environment. For example, it is desirable that the lower the illuminance of the image capturing environment is (the lower the object illuminance is), the smaller the number of pulse signals of the control signal CLK during one frame period in the second frame should be. This is because the lower (smaller) the illuminance of the image capturing environment is, the more likely a decrease in image quality due to crosstalk is to occur. The details of the change in (the adjustment of) the number of pulse signals of the control signal CLK according to the illuminance of the image capturing environment will be described below.

Figure 11A:
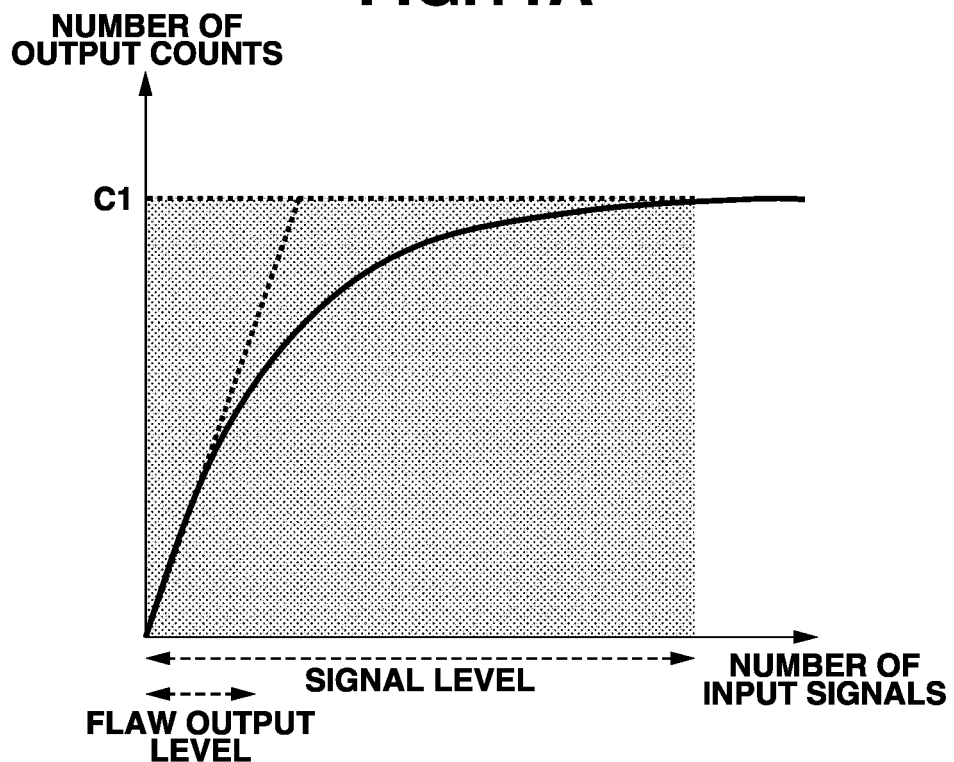
FIG. 11A is a diagram illustrating the number of output counts in the photoelectric conversion apparatus according to the first embodiment when high-illuminance image capturing is performed.
Figure 11B:
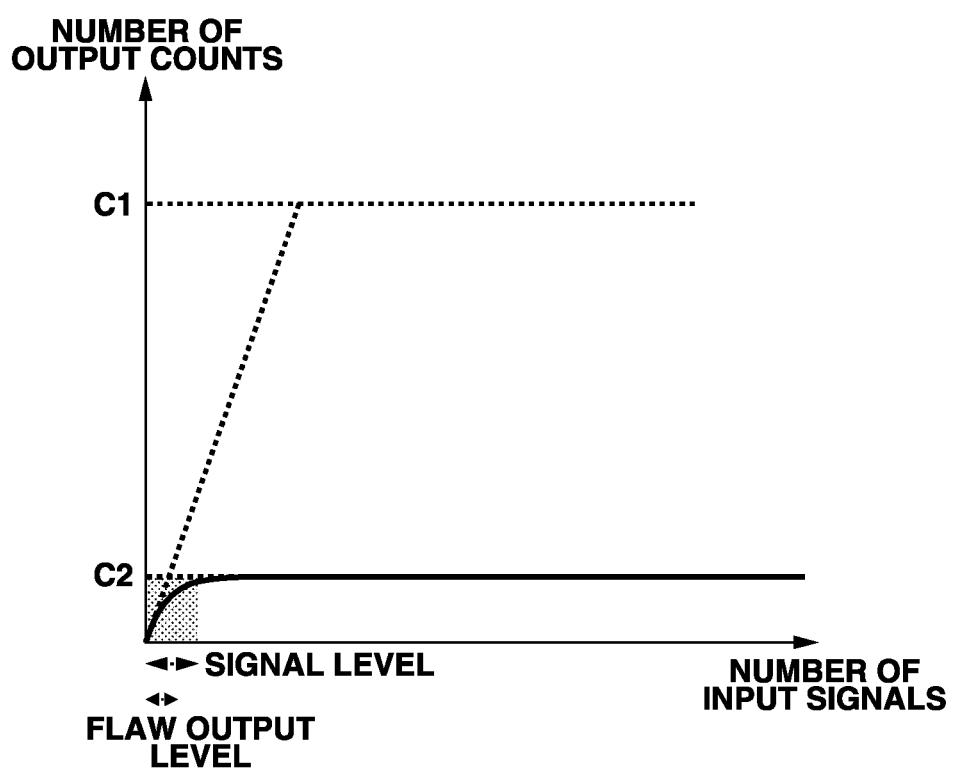
FIG. 11B is a diagram illustrating the number of output counts in the photoelectric conversion apparatus according to the first embodiment when low-illuminance image capturing is performed.

FIG. 11A illustrates the relationship between the number of incident photons and the number of output counts per pixel in the first frame when high-illuminance image capturing is performed in FIG. 10A and when low-illuminance image capturing is performed. FIG. 11B illustrates the relationship between the number of incident photons and the number of output counts per pixel in the second frame when low-illuminance image capturing is performed in FIG. 10B. The "dark counts" in FIG. 10B are considerably smaller than the "dark counts" in FIG. 10A. Thus, the flaw output level in FIG. 11B is considerably smaller than the flaw output level in FIG. 11A.

As illustrated in FIG. 11B, in the second frame of the photoelectric conversion apparatus 50 according to the present embodiment, it is possible to make the flaw output level lower than the signal level. Thus, it is possible to reduce the reading of a signal due to crosstalk from the pixel 101*a*. Thus, it is possible to prevent a decrease in image quality when low-illuminance image capturing is performed, compared to the photoelectric conversion apparatus according to the comparative example.

Figure 12A:
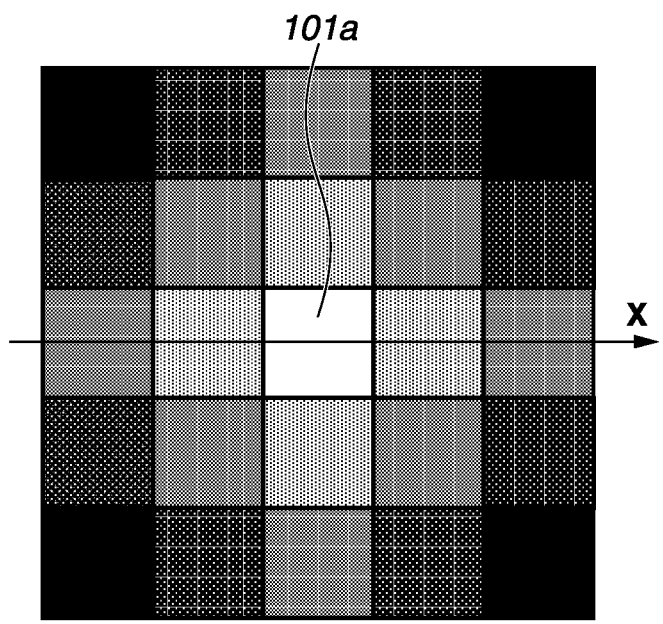
FIG. 12A is a diagram illustrating an influence of crosstalk between pixels in the photoelectric conversion apparatus according to the first embodiment.
Figure 12B:
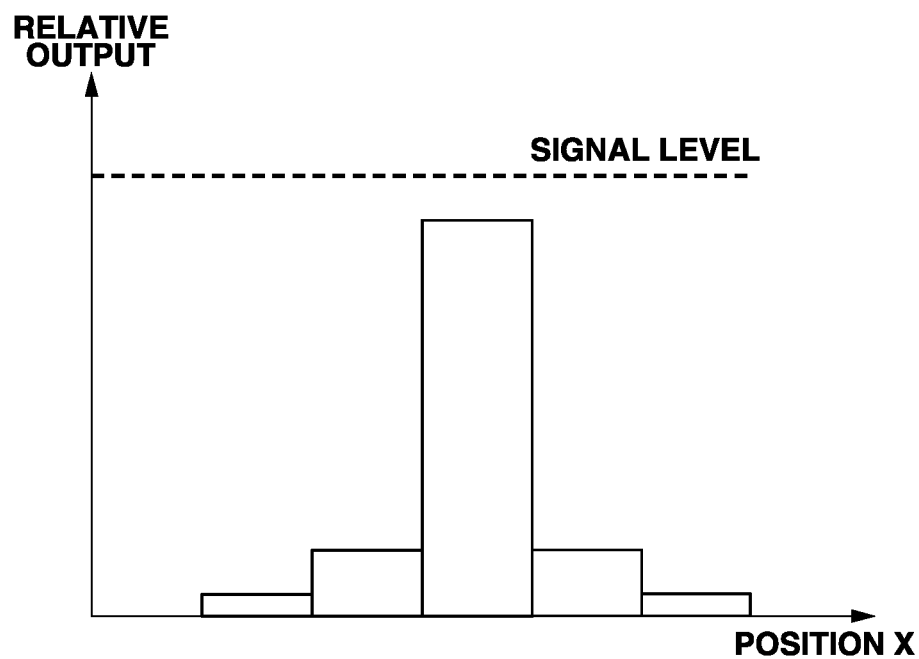
FIG. 12B is a diagram illustrating the influence of the crosstalk between the pixels in the photoelectric conversion apparatus according to the first embodiment.
Figure 12C:
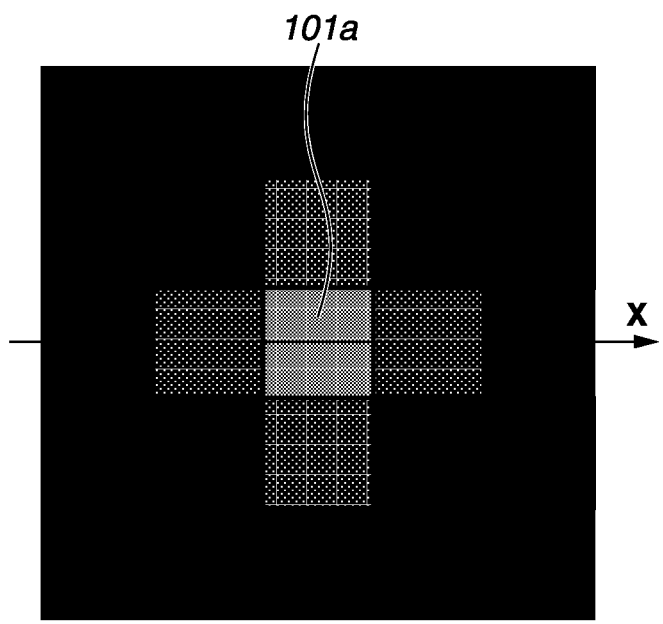
FIG. 12C is a diagram illustrating the influence of the crosstalk between the pixels in the photoelectric conversion apparatus according to the first embodiment.
Figure 12D:
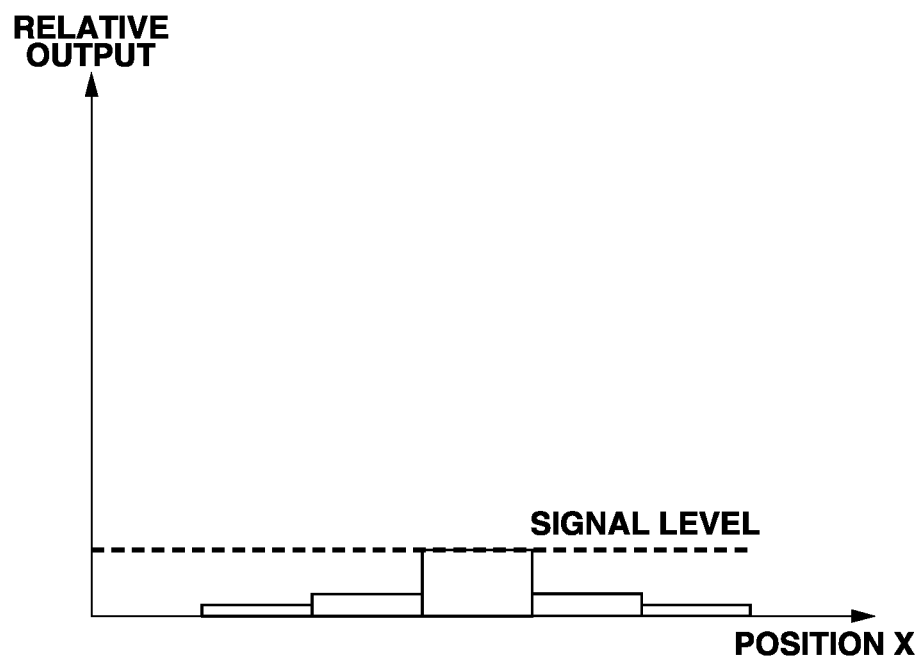
FIG. 12D is a diagram illustrating the influence of the crosstalk between the pixels in the photoelectric conversion apparatus according to the first embodiment.

FIG. 12A is a diagram illustrating the output distribution of the pixel 101*a* and the pixels near the pixel 101*a* in the first frame. FIG. 12B illustrates the relative output value on the X-axis in FIG. 12A. Also in FIG. 12B, the 5-by-5 pixel array is used. FIG. 12C is a diagram illustrating the output distribution of the pixel 101*a* and the pixels near the pixel 101a in the second frame. FIG. 12D illustrates the relative output value on the X-axis in FIG. 12C. FIGS. 12B and 12D illustrate the signal level when images are captured in the first and second frames, respectively. As can be understood from FIGS. 12C and 12D, based on the photoelectric conversion apparatus 50 according to the present embodiment, it is possible to make the relative output value of the flaw pixel 101a lower than that in the photoelectric conversion apparatus according to the comparative example (FIG. 9D) in the second frame. Thus, in the second frame, it is possible to reduce the occurrence of clustered flaws due to crosstalk and prevent a decrease in image quality when low-illuminance image capturing is performed.

<Widening of Dynamic Range>

As described above, when low-illuminance image capturing is performed, the number of pulse signals of the control signal CLK during one frame period is reduced, whereby it is possible to prevent a decrease in image quality that occurs due to crosstalk. As can be understood from FIG. 11B, however, if the second frame is used, an upper limit C2 of the number of output counts is smaller than an upper limit C1 of the number of output counts in the first frame. Thus, if image capturing is performed using only the second frame, the overexposure is likely to occur under an image capturing environment where the illuminance is low and the dynamic range is wide.

In the photoelectric conversion apparatus 50 according to the present embodiment, when low-illuminance image capturing is performed, image capturing is performed using both the second frame in which the number of pulse signals of the control signal CLK during one frame period is reduced, and the first frame in which the number of pulse signals of the control signal CLK during one frame period is maintained.

Then, the first image acquired in the first frame and the second image acquired in the second frame are combined together, thereby generating the combined image. That is, the photoelectric conversion apparatus 50 according to the present embodiment includes the photoelectric conversion element 100 that acquires images, and the combining processing unit 56 (FIG. 1A) that combines the images acquired by the photoelectric conversion element 100. With such a configuration, it is possible to achieve both the prevention of the overexposure under an image capturing environment where the illuminance is low and the dynamic range is wide, and the prevention of the occurrence of clustered flaws. Thus, based on the photoelectric conversion apparatus 50 according to the present embodiment, it is possible to improve image quality when image capturing is performed using an APD.

Figure 13A:
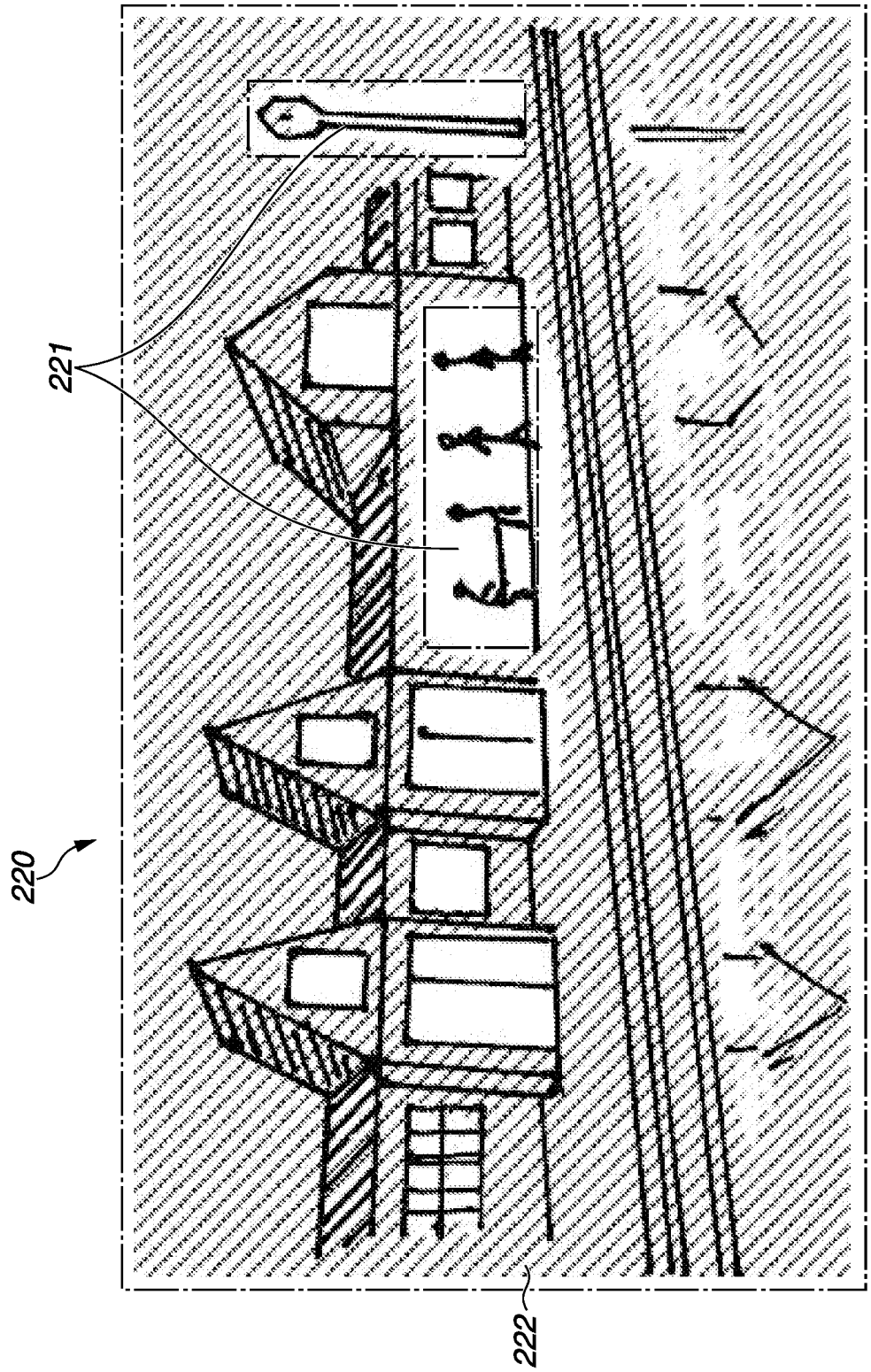
FIG. 13A is a diagram illustrating a combining process performed by the photoelectric conversion apparatus according to the first embodiment.

FIGS. 13A and 13B are diagrams illustrating an image combining process performed by the photoelectric conversion apparatus 50 according to the present embodiment. FIG. 13A illustrates an example of a captured image 220 under an image capturing environment where the illuminance is low and the dynamic range is wide. The captured image 220 is an image captured at night. An area 221 of the captured image 220 indicates an area having a high illuminance, and an area 222 of the captured image 220 indicates an area having a low illuminance. As described above, if the driving condition for the first frame is used under an image capturing environment where the illuminance is low, the influence of a decrease in image quality due to crosstalk is great. On the other hand, if the driving condition for the second frame is used under an environment where the illuminance is high, the overexposure is likely to occur. Accordingly, as illustrated in FIG. 13B, the area 221 using the first image acquired in the first frame and the area 222 using the second image acquired in the second frame may be combined together, thereby generating a combined image. Such a process is performed, whereby it is possible to achieve both the prevention of the overexposure in the area 221 and the prevention of clustered flaws in the area 222. As described above, in the present embodiment, the image of the first frame and the image of the second frame are acquired, and the combined image 220 is generated based on the image of the first frame and the image of the second frame. As a method for the photoelectric conversion apparatus 50 to acquire the object illuminance, for example, the object illuminance may be estimated from the level of a pixel signal acquired in the first frame. Alternatively, the photoelectric conversion apparatus 50 may include an illuminance sensor that measures an illuminance, separately from the photoelectric conversion element 100.

<Differences from Conventional Combining Between Frames>

The combining process described with reference to FIG. 13B is different from a combining process based on dynamic range expansion by combining a long-second exposure image and a short-second exposure image using a normal complementary metal-oxide-semiconductor (CMOS) image sensor in the following respects.

Figure 14A:
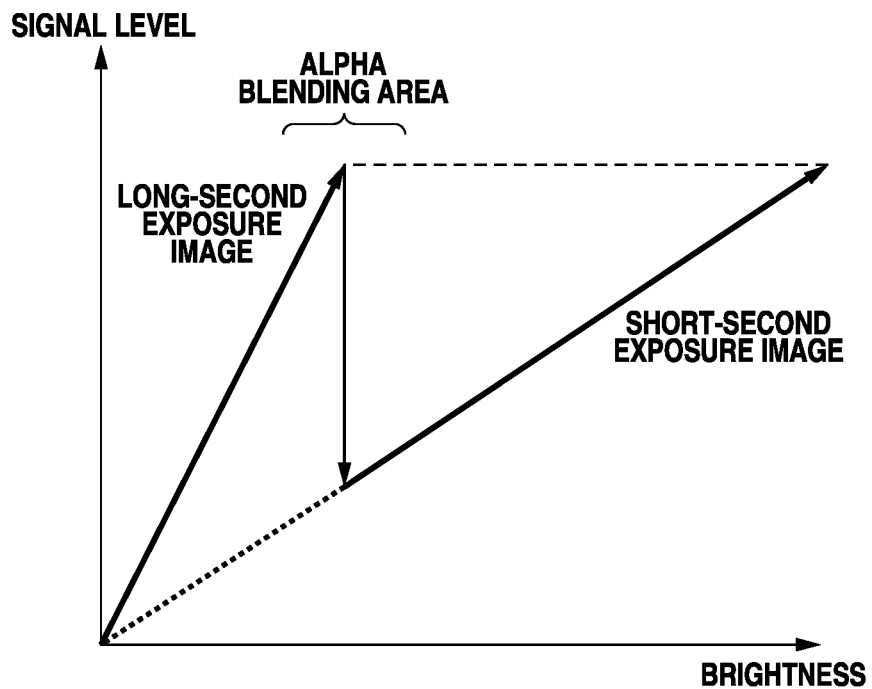
FIG. 14A is a diagram illustrating a conventional combining process.
Figure 14B:
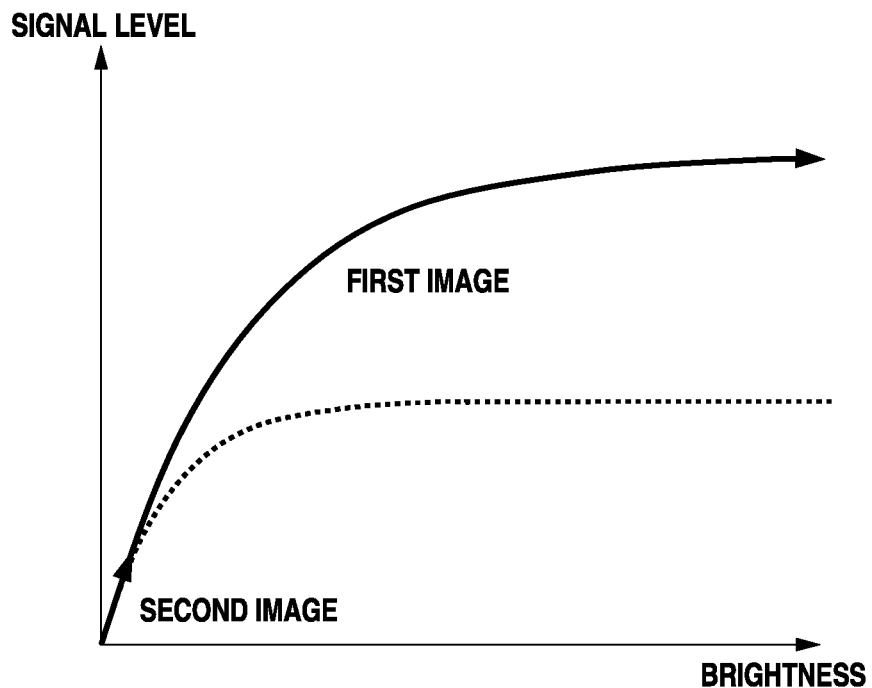
FIG. 14B is a diagram illustrating the combining process according to the first embodiment.

FIG. 14A is a diagram illustrating the conventional combining process. FIG. 14B is a diagram illustrating the combining process according to the first embodiment. In the conventional combining process, a plurality of signals different in sensitivity to the amount of incident light is combined together according to the amount of incident light. Thus, as illustrated in FIG. 14A, it is necessary to correct brightness. In a seam portion illustrated in FIG. 14A, it is necessary to combine signals having different signal-to-noise (SN) ratios. Thus, it is necessary to reduce the difference in level between the SN ratios at the seam. This requires a so-called alpha blending process for generating a new image signal by mixing image signals having different accumulation times.

If the combining process according to the first embodiment is compared to the conventional combining process (FIG. 14A), the photoelectric conversion apparatus 50 according to the first embodiment combines signals having equal exposure times as indicated by a solid curve in FIG. 14B in the combining process. Thus, it is not necessary to perform the brightness correction and the alpha blending process. Thus, circuits for the brightness correction and the alpha blending process are unnecessary. Thus, it is possible to miniaturize the photoelectric conversion apparatus 50 and achieve low power consumption in the photoelectric conversion apparatus 50. That is, the length of the exposure period in the first frame and the length of the exposure period in the second frame are made equal to each other, thereby miniaturizing the photoelectric conversion apparatus 50 and achieving low power consumption in the photoelectric conversion apparatus 50, which is desirable. In the present embodiment, since the alpha blending process is not performed, it can be said that the first and second images are not mixed together when the images are combined together. In the present embodiment, the lengths of the exposure periods being equal to each other means that the ratio of the length of the exposure period in the second frame to the length of the exposure period in the first frame is 0.9 times or more and 1.1 times or less, for example.

In FIG. 14B, the combined image is generated without mixing the first and second images at the seam between the first and second images. A curve indicated by a dashed line in FIG. 14B indicates the signal level in a case where the second image continues to be used.

In the combining process according to the first embodiment, not only is the alpha blending process simply unnecessary, but also the alpha blending process is undesirable in view of the prevention of clustered flaws. This is because in the first image, clustered flaws are likely to occur in an area where the illuminance is low, and therefore, if the first and second images are combined together by the alpha blending process, clustered flaws are likely to occur in the combined image.

The first embodiment may have the following configuration.

In the photoelectric conversion apparatus 50 according to the first embodiment, since the alpha blending in the combining process is unnecessary, a pixel signal required in each pixel 101 (a driving signal for driving the pixel 101) is that in either the first or second frame. Thus, a function (a pixel signal selection function) of the combining processing unit 56 may be built into the photoelectric conversion element 100. Specifically, the reading circuit 112 of the photoelectric conversion element 100 may include a comparator. Then, the comparator may be configured to, in the first frame, output a pixel signal to a pixel 101 in which the value of a pixel signal (a driving signal) is greater than or equal to a predetermined threshold among the plurality of pixels 101, and in the second frame, output a pixel signal to a pixel 101 other than the pixel 101. In this case, the reading circuit 112 functions as an output unit that outputs a signal for driving each of the plurality of pixels 101.

In a case where the photoelectric conversion element 100 includes a memory (an information storage unit), the following configuration may be employed. That is, a configuration may be employed in which, using address information regarding a flaw pixel stored in the memory, pixel signals in the second frame are output to the flaw pixel and pixels near the flaw pixel, and a pixel signal in the first frame is output to a pixel other than the pixels. The higher the output level of the flaw pixel is, the wider the range where pixel signals in the second frame are output near the flaw pixel may be. This is a measure taking into account only a portion near the flaw pixel.

The photoelectric conversion apparatus 50 may include a display unit and an input unit. The display unit is composed of, for example, a liquid crystal display. The display unit can function also as a touch panel and serve as a graphical user interface (GUI) for an interactive operation. The input unit is composed of a mouse, a keyboard, or a touch panel and acquires (receives) a user input. In a case where the photoelectric conversion apparatus 50 includes the display unit, the image of the first frame, the image of the second frame, and the combined image may be displayed on the display unit.

Although the signal processing circuit 103 in FIG. 4 includes the waveform shaping unit 210, the counter circuit 211, and the selection circuit 212, the waveform shaping unit 210 may not be provided so long as the counter circuit 211 can perform accurate counting.

With reference to FIGS. 15A and 15B and FIGS. 16A and 16B, the photoelectric conversion apparatus 50A according to the second embodiment of the present invention is described.

In the second embodiment, a description is given of a configuration in which the exposure times in the first and second frames, the number of pulse signals of the control signal CLK during one frame period, and digital gains are controlled according to the illuminance of the image capturing environment. Also in the second embodiment, the image of the first frame (the first image) and the image of the second frame (the second image) are combined together, thereby generating the combined image.

Figure 15A:
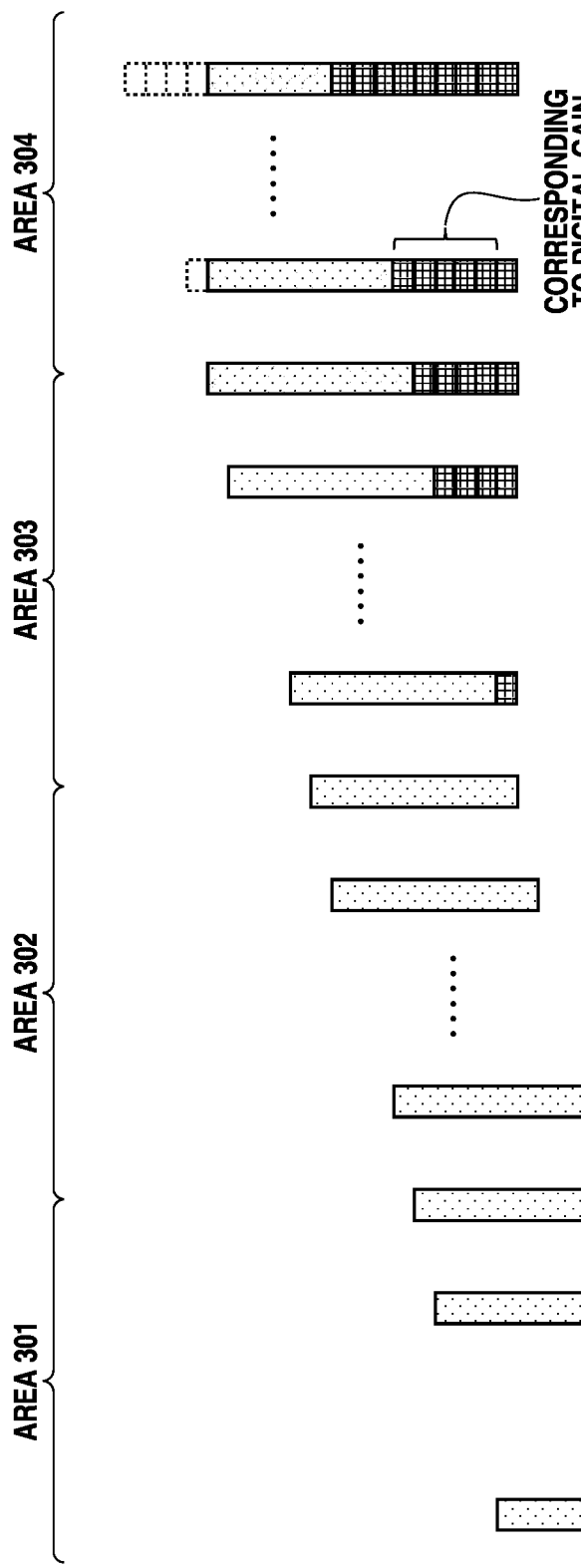
FIG. 15A is a diagram illustrating control according to an illuminance of a photoelectric conversion apparatus according to a second embodiment.
Figure 15B:
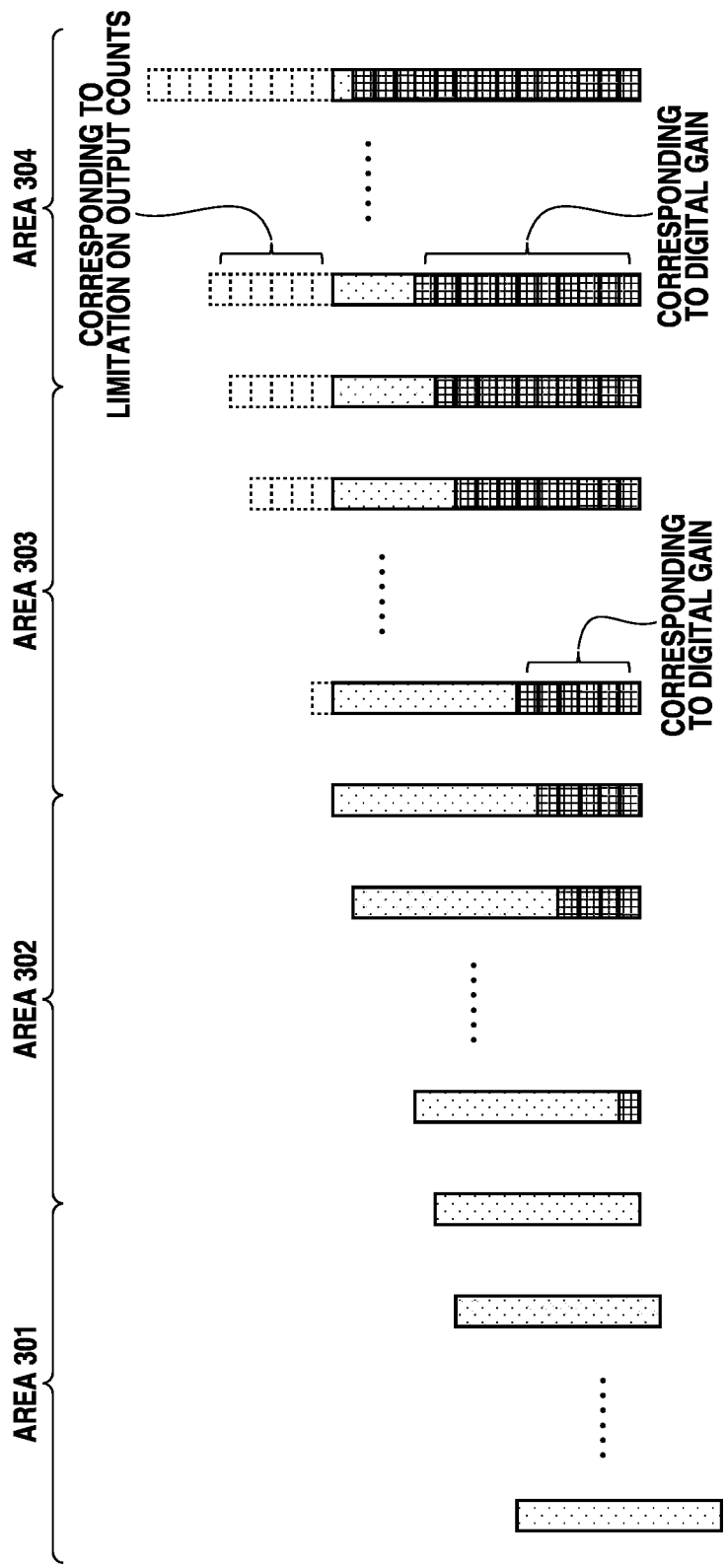
FIG. 15B is a diagram illustrating the control according to the illuminance of the photoelectric conversion apparatus according to the second embodiment.

FIG. 15A is a diagram illustrating the number of pulse signals of the control signal CLK during one frame period, the length of the exposure period, and the value of a digital gain applied to the first image in the first frame in the photoelectric conversion apparatus 50A according to the second embodiment. FIG. 15B is a diagram illustrating the number of pulse signals of the control signal CLK during one frame period, the length of the exposure period, and the value of a digital gain applied to the second image in the second frame in the photoelectric conversion apparatus 50A. In each of FIGS. 15A and 15B, the further to the left side, the higher the illuminance of the environment where the setting value is obtained. The further to the right side, the lower the illuminance of the environment where the setting value is obtained.

A description is given by dividing each of FIGS. 15A and 15B into four areas (areas 301, 302, 303, and 304).

<First Area>

In the first area 301, the object illuminance is greater than or equal to a first threshold. In the first area 301, in both the first and second frames, the length of the exposure period is inversely proportional to the illuminance, and the digital gain remains one time. When the number of pulse signals of the control signal CLK during one frame period in the first frame is a first number of pulse signals, and the number of pulse signals of the control signal CLK during one frame period in the second frame is a second number of pulse signal, the following relationship is satisfied. That is, the first and second numbers of pulse signals are both equal to the maximum number of pulse signals Nmax. FIG. 15A illustrates the period until the minimum length of the exposure period in the first frame is an exposure time Tmin. The ratio of the length of the exposure period in the second frame to the length of the exposure period in the first frame in the area 301 is constant regardless of the object illuminance. FIGS. 15A and 15B illustrate a case where the length of the exposure period in the second frame is 16 times the length of the exposure period in the first frame. In the area 301, with the illuminance where the length of the exposure period in the second frame coincides with the multiplicative inverse of the frame rate (hereinafter, referred to as "the maximum exposure period Tmax"), the area 301 transitions to the area 302. For example, if the frame rate is 30 frames per second (fps), the maximum exposure period Tmax is 1/30 seconds.

<Second Area>

In the second area 302, the object illuminance is less than the first threshold and greater than or equal to a second threshold smaller than the first threshold. In the second area 302 in the first frame, the length of the exposure period is inversely proportional to the illuminance while the first number of pulse signals remains the maximum number of pulse signals Nmax and the digital gain remains one time. On the other hand, in the second area 302 in the second frame, the digital gain is applied in inverse proportion to the illuminance while the length of the exposure period remains the maximum exposure period Tmax and the second number of pulse signals remains the maximum number of pulse signals Nmax (i.e., is equal to the first number of pulse signals). In the area 302, with the illuminance where the length of the exposure period in the first frame coincides with the maximum exposure period Tmax, the area 302 transitions to the area 303.

<Third Area>

In the third area 303, the object illuminance is less than the second threshold and greater than or equal to a third threshold smaller than the second threshold. In the third area 303, in both the first and second frames, the length of the exposure period coincides with the maximum exposure period Tmax. The second number of pulse signals in the second frame is proportional to the illuminance, and the digital gain is applied in inverse proportion to the illuminance. On the other hand, in the area 303, the first number of pulse signals in the first frame remains the maximum number of pulse signals Nmax, and the digital gain is applied in inverse proportion to the illuminance.

<Fourth Area>

In the fourth area 304, the object illuminance is less than the third threshold. In the fourth area 304, in both the first and second frames, the length of the exposure period coincides with the maximum exposure period Tmax. Then, the lower the illuminance of the environment is, the more proportional to the illuminance the first and second numbers of pulse signals are. That is, in the fourth area 304, the ratio of the number of pulse signals of the control signal CLK supplied to the second frame to the number of pulse signals of the control signal CLK supplied to the first frame does not change. The upper limit of the number of output counts decreases in proportion to pulse signals of the control signal CLK during one frame period. Thus, the digital gain is applied in inverse proportion to the illuminance. FIG. 15B illustrates the period until the minimum value of the number of pulse signals in the second frame is the maximum number of pulse signals Nmax/the maximum value D of the digital gain.

In the area 304, the ratio of the first number of pulse signals to the second number of pulse signals is constant. FIGS. 15A and 15B illustrate an example where the ratio of the first number of pulse signals to the second number of pulse signals is 16 times.

In each of FIGS. 15A and 15B, the vertical axis schematically illustrates the range of brightness represented by the first and second images. Specifically, each of FIGS. 15A and 15B illustrates the range of brightness so that when an object having the same brightness is captured, the greater the pixel output value is, the higher the position of the range of brightness is. Further, the smaller the pixel output value is, the lower the position of the range of brightness is. Vertical and horizontal hatching (grid hatching) indicates an amount corresponding to a change in brightness by the digital gain, and a dashed line indicates an amount corresponding to the limitation on output counts by control of the number of pulse signals. As can be understood from FIGS. 15A and 15B, in the areas 301 to 304, the first and second numbers of pulse signals, the lengths of the exposure periods, and the digital gains are controlled, whereby the range of brightness represented by the first and second images is bright in proportion to the illuminance of the environment. With such a configuration, in all the areas 301 to 304, it is possible to use the same processing flow as that of the combining process based on dynamic range expansion by combining a long-second exposure image and a short-second exposure image, which is used in a conventional CMOS image sensor. As a result, it is possible to reduce the calculation processing load of the combining process compared to a case where a different combining process is performed with respect to each area, which is desirable.

<Brightness Adjustment by Digital Gain>

Figure 16A:
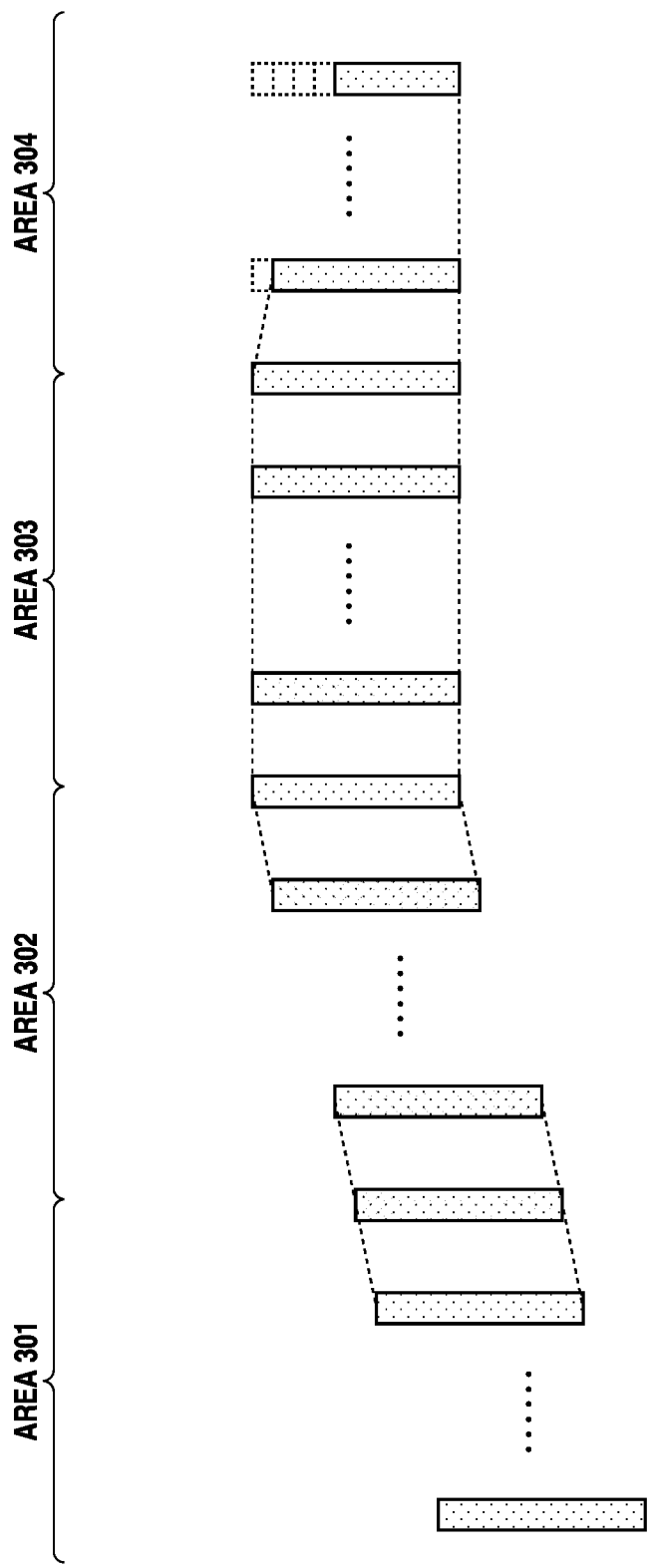
FIG. 16A is a diagram illustrating a range of an object illuminance with which image capturing can be performed in the photoelectric conversion apparatus according to the second embodiment.
Figure 16B:
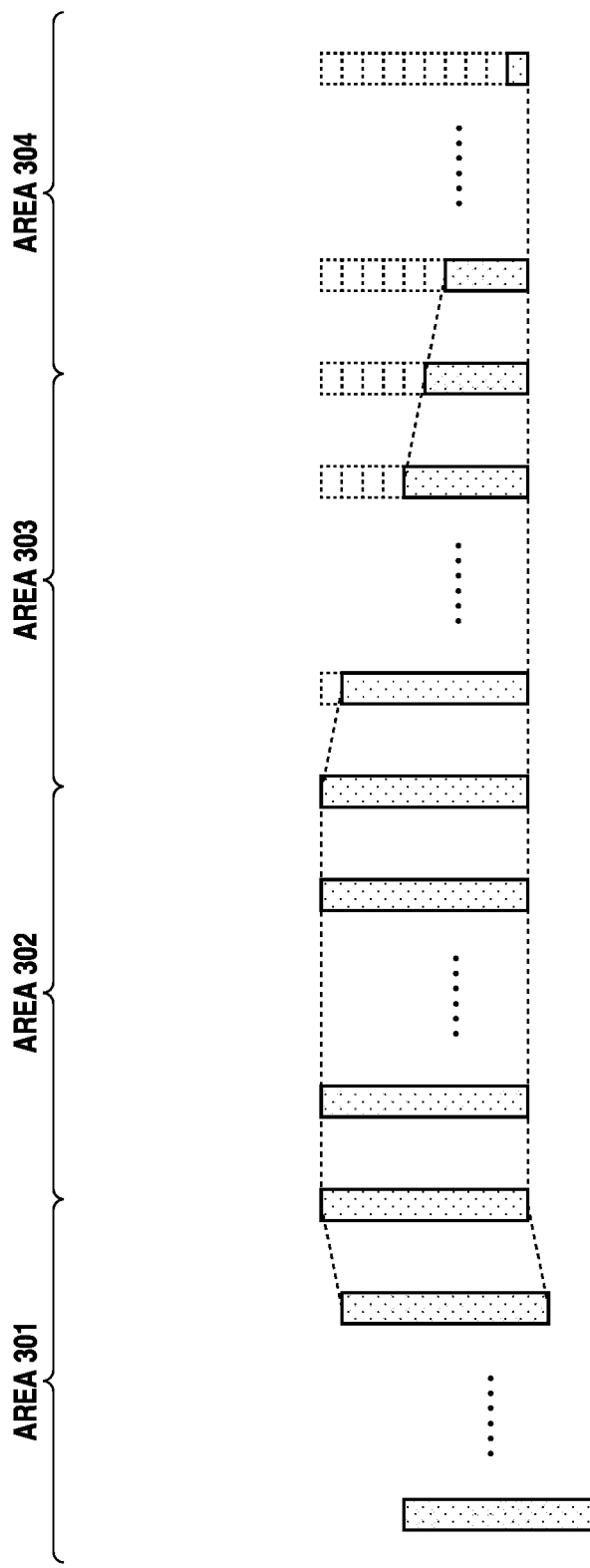
FIG. 16B is a diagram illustrating the range of the object illuminance with which image capturing can be performed in the photoelectric conversion apparatus according to the second embodiment.
Figure 17A:
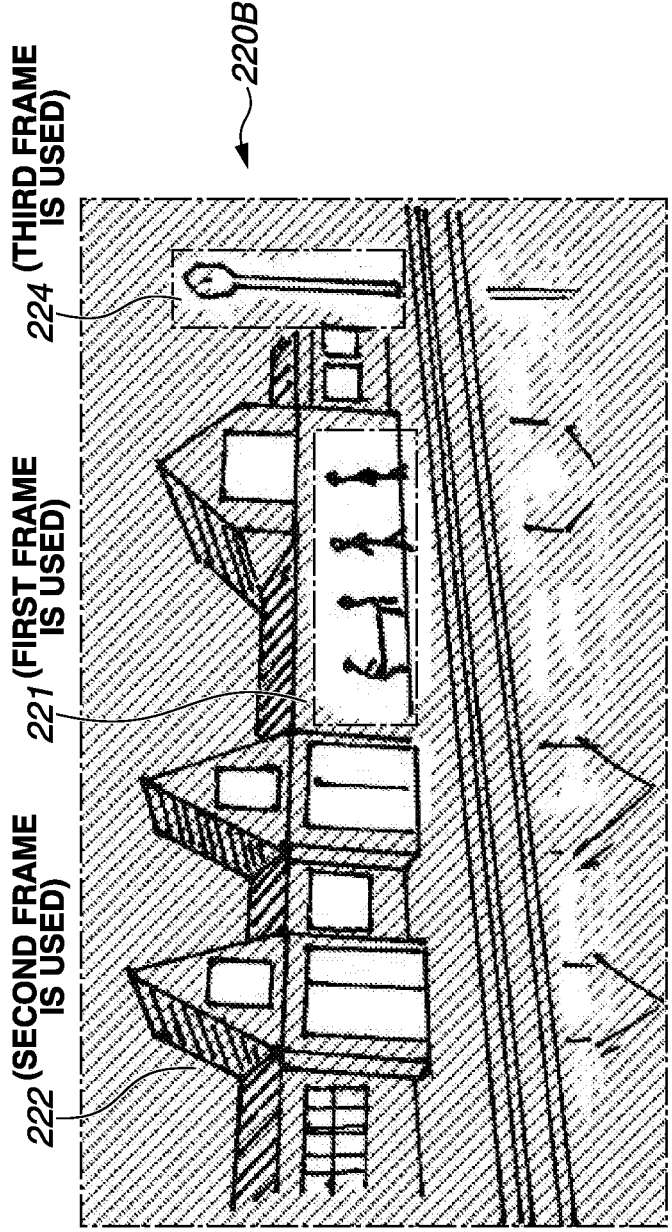
FIG. 17A is a diagram illustrating a combining process performed by a photoelectric conversion apparatus according to a third embodiment.

FIG. 16A illustrates factors for determining the upper limit and the lower limit of the object illuminance with which image capturing can be performed in each of the areas 301 to 304 in the first frame. FIG. 16B illustrates factors for determining the upper limit and the lower limit of the object illuminance with which image capturing can be performed in each of the areas 301 to 304 in the second frame. FIG. 16A is obtained by eliminating the amount corresponding to the change in the brightness by the digital gain from FIG. 15A. FIG. 16B is obtained by eliminating the amount corresponding to the change in the brightness by the digital gain from FIG. 15B.

As can be understood from FIGS. 16A and 16B, in the area 301, the upper limits and the lower limits of the range of the object illuminance with which image capturing can be performed in the first and second frames are all determined according to the lengths of the exposure periods. That is, in the area 301, the dynamic range expansion by combining a long-second exposure image and a short-second exposure image, which is used also in a so-called normal CMOS image sensor, can be applied as it is.

Also in the area 302, the upper limits and the lower limits of the range of the object illuminance with which image capturing can be performed in the first and second frames are all determined according to the lengths of the exposure periods. In the area 302, the upper limit and the lower limit of the range of the object illuminance with which image capturing can be performed in the first frame change according to the length of the exposure period in the first frame. On the other hand, in the area 302, the exposure period in the second frame is constant, and therefore, the upper limit and the lower limit of the range of the object illuminance with which image capturing can be performed in the second frame are constant in the area 302. Thus, in the area 302, the difference in sensitivity between the first and second frames varies depending on the illuminance of the object. Accordingly, as illustrated in FIG. 15B, the digital gain is applied to the second image, thereby increasing brightness represented by the second image. Consequently, it is possible to maintain the difference in apparent brightness (16 times in FIGS. 15A and 15B) between the first and second images at the same value as that in the area 301. Thus, it is possible to use the same combining method as that in the area 301.

In the area 303, the upper limit and the lower limit of the range of the object illuminance with which image capturing can be performed in the first frame are determined according to the length of the exposure period. In the area 303, the exposure period in the first frame is constant, and therefore, the upper limit and the lower limit of the range of the object illuminance with which image capturing can be performed in the first frame are constant in the area 303. Similarly, in the area 303, the exposure period in the second frame is constant, and therefore, the lower limit of the range of the object illuminance with which image capturing can be performed in the second frame is constant in the area 303. In the second frame, however, the second number of pulse signals is changed in proportion to the object illuminance. Thus, the darker the object illuminance is, the lower the upper limit of the range of the object illuminance with which image capturing can be performed in the second frame is. Accordingly, in the area 303, in addition to the digital gain applied with the illuminance at the boundary between the areas 302 and 303, a digital gain is applied to the second image to compensate for the lowering of the upper limit of the object illuminance with which image capturing can be performed in the second frame. Then, a digital gain is also applied to the first image so that the difference in apparent brightness (16 times in FIGS. 15A and 15B) from the second image is the same as those in the areas 301 and 302. That is, in the area 303, the digital gains applied to the first and second images are adjusted so that the ratio of the lower limit of the range of brightness represented by the second image to the lower limit of the range of brightness represented by the first image is constant regardless of the object illuminance. Consequently, also in the areas 302 and 303, it is possible to use the same combining method as that in the area 301.

In the area 304, the darker the object illuminance is, the lower the upper limit of the object illuminance with which image capturing can be performed in the second frame also is, and the lower the upper limit of the object illuminance with which image capturing can be performed in the first frame also is. Accordingly, in the area 304, in addition to the digital gains applied with the illuminance at the boundary between the areas 303 and 304, digital gains are applied to both the first and second images to compensate for the lowering of the upper limits of the object illuminance with which image capturing can be performed. That is, in the area 304, the digital gains applied to the first and second images are adjusted so that the ratio of the lower limit of the range of brightness represented by the second image to the lower limit of the range of brightness represented by the first image is constant regardless of the object illuminance. Consequently, it is possible to maintain the difference in apparent brightness between the first and second images at the same value as that in the area 301. Thus, it is possible to use the same combining method as that in the area 301.

As described above, in the photoelectric conversion apparatus 50A according to the present embodiment, the digital gains applied to images are adjusted, thereby maintaining the difference in apparent brightness between the first and second images (16 times in FIGS. 15A and 15B) constant regardless of the brightness of the area. As a result, it is possible to use the same combining method regardless of the brightness of the area.

As a method for the photoelectric conversion apparatus 50A to measure the object illuminance, the object illuminance may be estimated from the level of a pixel signal acquired in the previous frame, or the photoelectric conversion apparatus 50A may include an illuminance sensor that measures an illuminance, separately from the photoelectric conversion element 100.

<Differences from Conventional Combining Between Frames>

In a case where the length of the exposure period is changed according to the brightness of the object, the number of photons incident during the exposure period changes. Thus, not only does the apparent brightness change, but also the saturation level and the SN ratio of the image change. A long-second exposure image and a short-second exposure image are combined together using this effect, whereby it is possible to generate an image having an expanded dynamic range. However, in a case where the digital gains are changed according to the brightness of the object as in the present embodiment, the saturation level and the SN ratio of the image do not change. That is, in the case of the conventional combining technique for combining a long-second exposure image and a short-second exposure image, there is no benefit of adjusting the apparent brightness using the digital gains.

In the photoelectric conversion apparatus 50A according to the present embodiment, in the area 301 where the illuminance is high, the dynamic range is widened by the conventional combining technique for combining a long-second exposure image and a short-second exposure image. On the other hand, in the area 304 where the illuminance is low, both the prevention of the overexposure and the prevention of clustered flaws are achieved by combining images different in the number of pulse signals. To thus perform different types of driving according to illuminances and use the same combining method also in the areas 302 and 303 having illuminances between these illuminances, the photoelectric conversion apparatus 50A according to the present embodiment adjusts the apparent brightness using the digital gains.

The second embodiment may have the following configuration.

Although FIGS. 15A and 15B illustrate an example where the difference in apparent brightness between the first and second images is 16 times, the difference in apparent brightness may not be 16 times. Particularly in the area 301, however, if the difference in the length of the exposure period is too great, the difference in level between the SN ratios at the seam is conspicuous. If the difference in the length of the exposure period is too small, the effect of the dynamic range expansion is small. Thus, it is desirable that the difference in apparent brightness should be from about 4 times to 64 times.

The combining process may not be performed in all the areas 301 to 304. If the combining process is performed in only the area 304, or only the area 303, or only the areas 303 and 304, as described in the first embodiment, since signals having equal exposure times are combined together, the correction using the digital gains may not be performed. That is, if the apparent brightness should be adjusted, the correction using the digital gains may be performed after the combining.

<Correction of Linearity>

As indicated by a solid curve in FIG. 11B, in a case where the recharge frequency of the APD 201 is controlled by the control signal CLK, the relationship of the number of output signals (the number of output counts) to the number of input signals (the number of incident photons) is not linear. Specifically, if the number of input signals is Nph, the number of output signals is Nct, the frequency of the control signal CLK (the multiplicative inverse of the number of pulse signals of the control signal CLK per unit time) is f, and the length of the exposure period is T, the number of output signals Nct is represented by the following formula 1.

$$Nct = fT\left(1 - e^{-\frac{Nph}{fT}}\right) \qquad (1)$$

Thus, before the combining process, the linearity of each of the first and second images may be corrected using the following formula 2. Particularly in the areas 303 and 304, the number of output counts determined by fT changes according to the illuminance. Thus, the relationship of the number of output signals to the number of input signals is not constant. Thus, particularly in the areas 303 and 304, it is desirable to correct the linearity that varies according to fT. Specifically, the number of input signals Nph may be obtained from the number of output signals Nct using the following formula 2.

$$Nph = -fT \times \ln\left(\frac{1 - Nct}{fT}\right) \qquad (2)$$

With reference to FIGS. 17A and 17B, the photoelectric conversion apparatus 50B according to the third embodiment of the present invention is described.

In the first embodiment, a case has been described where two images (the first and second images) are acquired and combined together. In the third embodiment, a case is described where three images are acquired and combined together. Specifically, the photoelectric conversion apparatus 50B according to the third embodiment performs a combining process using a third image acquired in a third frame (an image of the third frame) in addition to the first image acquired in the first frame and the second image acquired in the second frame. FIGS. 17A and 17B are diagrams illustrating the combining process performed by the photoelectric conversion apparatus 50B. A table 700 in FIG. 17A illustrates the number of pulse signals and the length of the exposure period in each of the first, second, and third frames. The number of pulse signals in each of the first and third frames is the maximum number of pulse signals Nmax, and the number of pulse signals in the second frame is one-sixteenth of the maximum number of pulse signals Nmax. The length of the exposure period in each of the first and second frames is the maximum exposure period Tmax, and the length of the exposure period of the third frame is one-sixteenth of the maximum exposure period Tmax.

Below the table 700, images mainly used in areas 221, 222, and 224 of a captured image 220B are illustrated. The object illuminance of the area 224 is brighter (higher) than that of the area 221. In the captured image 220B of the photoelectric conversion apparatus 50B, the second image is used in the area 222 of which the object illuminance is dark (low), the first image is used in the area 221 of which the object illuminance is brighter (higher) than that of the area 222, and the third image is used in the area 224 of which the object illuminance is even brighter than that of the area 221. The number of pulse signals in the third frame is the same as that in the first frame (the maximum number of pulse signals Nmax), and the length of the exposure period in the third frame is shorter than those in the first and second frames. That is, images are captured in the first frame, the second frame in which the length of the exposure period is the same as that in the first frame and the number of pulse signals is smaller than that in the first frame, and the third frame in which the length of the exposure period is shorter than that in the first frame and the number of pulse signals is equal to that in the first frame. Then, the images captured in the respective frames are combined together, thereby generating a combined image (the captured image 220B). Thus, it is possible to further expand the dynamic range in addition to the prevention of clustered flaws and the prevention of the overexposure, which is desirable.

FIG. 17B is a diagram illustrating the relationship of the output signal level to the brightness of the object in each of the first, second, and third images. At the seam between the first and second images equal in the length of the exposure period, the alpha blending is unnecessary, but if the object illuminance of the area 224 is higher than that of the area 221, the effect of the dynamic range expansion in the combined image may be weak using the first and second images alone. Accordingly, in the present embodiment, the combined image is generated using not only the first and second images but also the third image, thereby further increasing the effect of the dynamic range expansion. At the seam between the first and third images different in the length of the exposure period, the alpha blending is necessary. Thus, in the present embodiment, the brightness correction is performed to reduce the influence of the alpha blending.

That is, the photoelectric conversion apparatus 50B performs the brightness correction and the alpha blending (the mixture of images) at the seam between the first and third images, and does not perform the brightness correction and the alpha blending (the mixture of images) at the seam between the first and second images equal in the length of the exposure period.

As described above, different combining processes are used at the seam between frames different in the exposure period and at the seam between frames different in the number of pulse signals, it is possible to further improve image quality, which is desirable.

OTHER EMBODIMENTS

Alternatively, a computer program for achieving a part or all of the control according to the first to third embodiments may be supplied to the photoelectric conversion apparatuses 50, 50A, and 50B via a network or various storage media. Then, a computer (a CPU or an MPU) of each of the photoelectric conversion apparatuses 50, 50A, and 50B may read and execute the program. In this case, the program and a storage medium that stores the program constitute the present invention.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2022-012037, filed Jan. 28, 2022, which is hereby incorporated by reference herein in its entirety.

What is claimed is:

1. A photoelectric conversion apparatus comprising:
a processing circuit; and
a memory that stores a computer-readable instruction for causing, when executed by the processing circuit, the photoelectric conversion apparatus to
generate control signals for controlling an operation of an image capturing unit configured to perform image capturing using avalanche light emission;
control a first generation unit to generate control signals of a first frame and a second frame, wherein a number of the control signals during an exposure period of the second frame is smaller than a number of the control signals during an exposure period of the first frame;
acquire an output of the first frame captured by the image capturing unit and an output of the second frame captured by the image capturing unit; and
generate an image based on the output of the first frame and the output of the second frame,
wherein the lower an object illuminance is, the smaller the number of the control signals supplied from the first generation unit to the output of the second frame is.

2. The photoelectric conversion apparatus according to claim 1, wherein a length of the exposure period in the first frame and a length of the exposure period in the second frame are equal to each other.

3. The photoelectric conversion apparatus according to claim 2, wherein the image is generated by combining a region of the output of the first frame and a region of the output of the second frame.

4. The photoelectric conversion apparatus according to claim 2, wherein the image is generated based on the output of the first frame, the output of the second frame, and an output of a third frame which is captured by the image capturing unit and in which a length of an exposure period is shorter than the length of the exposure period in the output of the first frame, wherein the first generation unit is controlled to generate control signals of the third frame and the number of the control signals of the third frame is equal to the number of the control signals in the output of the first frame.

5. The photoelectric conversion apparatus according to claim 4, wherein the image is generated by mixing the output of the first frame and the output of the third frame at a seam between the output of the first frame and the output of the third frame.

6. The photoelectric conversion apparatus according to claim 1, wherein a ratio of the number of the control signals input during the exposure period in the second frame to the number of the control signals input during the exposure period in the first frame is one-half or less.

7. The photoelectric conversion apparatus according to claim 1,
wherein the computer-readable instruction further causes the photoelectric conversion apparatus to output a driving signal for driving each of a plurality of pixels, wherein the plurality of the pixels is included in the image capturing unit, and
wherein in the capturing of the first frame, the driving signal is output to a pixel in which a value of the driving signal is greater than or equal to a predetermined threshold, and in the capturing of the second frame, the driving signal is output to a pixel other than the pixel.

8. The photoelectric conversion apparatus according to claim 7,
wherein the computer-readable instruction further causes the photoelectric conversion apparatus to store address information regarding a pixel having a defect among the plurality of pixels, and
wherein the driving signal in the second frame is output to the pixel having the defect and a pixel near the pixel and the driving signal in the first frame is output to a pixel other than the pixels.

9. The photoelectric conversion apparatus according to claim 1, wherein in the output of the first frame and the output of the second frame, in a first area where the object illuminance is greater than or equal to a first threshold, the number of the control signals supplied to the first frame and the number of the control signals supplied to the second frame are equal to each other, and a length of the exposure period in the first frame and a length of the exposure period in the second frame are different from each other.

10. The photoelectric conversion apparatus according to claim 9, wherein in the first area, a ratio of the length of the exposure period in the second frame to the length of the exposure period in the first frame is constant regardless of the object illuminance.

11. The photoelectric conversion apparatus according to claim 9, wherein in a second area where the object illuminance is less than the first threshold and greater than or equal to a second threshold less than the first threshold, the number of the control signals supplied to the first frame and the number of the control signals supplied to the second frame are equal to each other, the length of the exposure period in the first frame is inversely proportional to the object illuminance, and the length of the exposure period in the second frame is constant regardless of the object illuminance.

12. The photoelectric conversion apparatus according to claim 11,
wherein the computer-readable instruction further causes the photoelectric conversion apparatus to; adjust gains applied to the output of the first frame and the output of the second frame, and
wherein a gain applied to an image of the second frame is adjusted so that a ratio of a range of brightness represented by the image of the second frame to a range of brightness represented by an image of the first frame in the second area is the same as the ratio in the first area.

13. The photoelectric conversion apparatus according to claim 12, wherein a ratio of the length of the exposure period in the second frame to the length of the exposure period in the first frame in the first area is equal to the ratio of the range of brightness represented by the image of the second frame to the range of brightness represented by the image of the first frame in the second area.

14. The photoelectric conversion apparatus according to claim 12, wherein in a third area where the object illuminance is less than the second threshold and greater than or equal to a third threshold less than the second threshold, the lower the object illuminance is, the smaller the number of the control signals supplied to the second frame is, and the number of the control signals supplied to the first frame and the length of the exposure period in the first frame are constant regardless of the object illuminance.

15. The photoelectric conversion apparatus according to claim 14, wherein gains applied to the image of the first frame and the image of the second frame is adjusted so that a ratio of a lower limit of the range of brightness represented by the image of the second frame to a lower limit of the range of brightness represented by the image of the first frame is constant regardless of the object illuminance in the third area.

16. The photoelectric conversion apparatus according to claim 14, wherein in a fourth area where the object illuminance is less than the third threshold, a ratio of the number of the control signals supplied to the second frame to the number of the control signals supplied to the first frame does not change.

17. The photoelectric conversion apparatus according to claim 1, wherein the image capturing unit includes an avalanche photodiode configured to generate the avalanche light emission, and based on the number of incident photons per pixel in the avalanche photodiode, the number of output counts, a frequency of the control signals, and a length of the exposure period, corrects a linearity between the number of incident photons and the number of output counts in the output of the first frame and the output of the second frame.

18. A control method for controlling a photoelectric conversion apparatus including an image capturing unit configured to perform image capturing using avalanche light emission, the control method comprising:
  generating control signals for controlling an operation of the image capturing unit to capture a first frame and a second frame, wherein a number of the control signals during an exposure period of the second frame is smaller than a number of the control signals during an exposure period of the first frame;
  acquiring an output of the first frame captured by the image capturing unit and an output of the second frame which is captured by the image capturing unit; and
  generating an image based on the output of the first frame and the output of the second frame,
  wherein the lower an object illuminance is, the smaller the number of the control signals supplied from the first generation unit to the output of the second frame is.

19. A non-transitory storage medium that stores a program for causing a computer to execute a control method for controlling a photoelectric conversion apparatus including an image capturing unit configured to perform image capturing using avalanche light emission, the control method comprising:
  generating control signals for controlling an operation of the image capturing unit to capture a first frame and a second frame, wherein a number of the control signals during an exposure period of the second frame is smaller than a number of the control signals during an exposure period of the first frame;
  acquiring an output of the first frame captured by the image capturing unit and an output of the second frame which is captured by the image capturing unit; and
  generating an image based on the output of the first frame and the output of the second frame,
  wherein the lower an object illuminance is, the smaller the number of the control signals supplied from the first generation unit to the output of the second frame is.

* * * * *